United States Patent
Lee et al.

(10) Patent No.: US 12,238,727 B2
(45) Date of Patent: Feb. 25, 2025

(54) METHODS AND APPARATUS FOR WIRELESS TRANSMIT/RECEIVE UNIT (WTRU) POWER CONTROL

(71) Applicant: INTERDIGITAL PATENT HOLDINGS, INC., Wilmington, DE (US)

(72) Inventors: Moon-il Lee, Melville, NY (US); Erdem Bala, East Meadow, NY (US); Janet A. Stern-Berkowitz, Little Neck, NY (US); Afshin Haghighat, Ile-Bizard (CA); Marian Rudolf, Montreal (CA); Paul Marinier, Brossard (CA); Faris Alfarhan, Montreal (CA); Dylan James Watts, Montreal (CA); Ghyslain Pelletier, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 552 days.

(21) Appl. No.: 17/269,724

(22) PCT Filed: Aug. 21, 2019

(86) PCT No.: PCT/US2019/047429
§ 371 (c)(1),
(2) Date: Feb. 19, 2021

(87) PCT Pub. No.: WO2020/041421
PCT Pub. Date: Feb. 27, 2020

(65) Prior Publication Data
US 2021/0321446 A1    Oct. 14, 2021

Related U.S. Application Data

(60) Provisional application No. 62/886,083, filed on Aug. 13, 2019, provisional application No. 62/840,935, (Continued)

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0051* (2013.01); *H04W 72/0446* (2013.01); *H04W 72/535* (2023.01); *H04W 72/54* (2023.01)

(58) Field of Classification Search
CPC ............ H04W 72/23; H04W 72/0446; H04W 72/535; H04W 72/54; H04L 5/0044;
(Continued)

(56) References Cited

U.S. PATENT DOCUMENTS 9,723,604 B2    8/2017  Morioka
2017/0295601 A1  10/2017  Kim et al.
(Continued)

FOREIGN PATENT DOCUMENTS

CN    112332891 A  *  2/2021  .......... H04B 7/0413
CN    112399594 A  *  2/2021
(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Chi H Pham
*Assistant Examiner* — Vladislav Y Agureyev
(74) *Attorney, Agent, or Firm* — Volpe Koenig

(57) ABSTRACT

Methods and apparatus for wireless transmit/receive unit (WTRU) power control are described. A method includes receiving a time domain resource allocation (TDRA) list configuration including entries, each including a resource allocation that includes a slot offset value. L1 signaling is
(Continued)

received indicating a minimum slot offset value. Downlink control information (DCI) is decoded on a physical downlink control channel in a slot. An index is obtained from the decoded DCI, identifying an entry in the TDRA list. A particular slot offset value identified by the index is retrieved from the TDRA list and compared with the minimum slot offset value. If the particular slot offset value is less than the minimum slot offset value, the entry is invalid. If the particular slot offset value is greater than or equal to the minimum slot offset value, a physical downlink shared channel is received.

12 Claims, 15 Drawing Sheets

Related U.S. Application Data filed on Apr. 30, 2019, provisional application No. 62/753,597, filed on Oct. 31, 2018, provisional application No. 62/752,797, filed on Oct. 30, 2018, provisional application No. 62/735,939, filed on Sep. 25, 2018, provisional application No. 62/720,547, filed on Aug. 21, 2018.

(51) Int. Cl.
  *H04W 72/0446* (2023.01)
  *H04W 72/50* (2023.01)
  *H04W 72/54* (2023.01)
(58) Field of Classification Search
  CPC ..... H04L 5/005; H04L 5/0051; H04L 5/0094; Y02D 30/70
  See application file for complete search history.

(56) References Cited

U.S. PATENT DOCUMENTS

| | | | | |
|---|---|---|---|---|
| 2019/0149365 | A1* | 5/2019 | Chatterjee | H04L 5/0094 370/329 |
| 2019/0199420 | A1* | 6/2019 | Faxér | H04L 5/0057 |
| 2019/0223084 | A1* | 7/2019 | John Wilson | H04W 76/11 |
| 2020/0029315 | A1* | 1/2020 | Lin | H04L 1/0075 |
| 2020/0037260 | A1* | 1/2020 | Fu | H04W 52/325 |
| 2020/0044723 | A1* | 2/2020 | Cirik | H04B 7/0695 |
| 2020/0045745 | A1* | 2/2020 | Cirik | H04W 76/11 |
| 2020/0053755 | A1* | 2/2020 | Ang | H04W 72/0446 |
| 2020/0100154 | A1* | 3/2020 | Cirik | H04B 7/0695 |
| 2020/0100311 | A1* | 3/2020 | Cirik | H04W 72/23 |
| 2020/0178223 | A1* | 6/2020 | Kang | H04L 5/0057 |
| 2020/0204293 | A1* | 6/2020 | Kim | H04W 72/23 |
| 2021/0120574 | A1* | 4/2021 | Takeda | H04W 72/23 |
| 2021/0167930 | A1* | 6/2021 | Jeon | H04L 27/2607 |
| 2021/0266902 | A1* | 8/2021 | Takeda | H04L 27/26025 |
| 2022/0039009 | A1* | 2/2022 | Iyer | H04L 5/0098 |
| 2022/0104122 | A1* | 3/2022 | Maleki | H04W 52/028 |
| 2022/0158716 | A1* | 5/2022 | Tie | H04B 7/0857 |
| 2022/0232611 | A1* | 7/2022 | Hakola | H04W 52/0229 |

FOREIGN PATENT DOCUMENTS

| | | | | |
|---|---|---|---|---|
| EP | 3979543 | A1 * | 4/2022 | H04B 7/04 |
| EP | 4096141 | A1 * | 11/2022 | H04L 27/2601 |
| WO | 2017184049 | A1 | 10/2017 | |
| WO | 2018063463 | A1 | 4/2018 | |
| WO | 2018144560 | A1 | 8/2018 | |
| WO | 2018144920 | A1 | 8/2018 | |
| WO | WO-2019193732 | A1 * | 10/2019 | H04L 1/08 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless Lan Medium Access Control (MAC) and Physical Layer (PHY) Specifications; Amendment 2: Sub 1 GHz License Exempt Operation, IEEE 802.11ah-2016 (Dec. 7, 2016).
Interdigital, Inc., "Discussion on Power Saving Techniques," 3GPP TSG RAN WG1 Meeting #95, R1-1813243, Spokane, USA (Nov. 12-16, 2018).
Interdigital, Inc., "On Power Saving Techniques," 3GPP TSG RAN WG1 Ad-Hoc Meeting 1901, R1-1900813, Taipei, Taiwan (Jan. 21-25, 2019).
Qualcomm Incorporated, "Details of CSI framework," 3GPP TSG RAN WG1 Meeting #90bis, R1-1718544, R1-1718544 (Oct. 9-13, 2017).
Qualcomm Incorporated, "Maintenance for CSI Measurement," 3GPP TSG RAN WG1 Meeting #92bis, R1-1805521, Sanya, China (Apr. 16-20, 2018).
Qualcomm Incorporated, "Remaining Issues on BWP," 3GPP TSG RAN WG1 Meeting #93, R1-1807368, Busan, Korea (May 21-25, 2018).
Qualcomm Incorporated, "Views on UE power saving," 3GPP TSG RAN WG1 Meeting #94, R1-1809462, Gothenburg, Sweden (Aug. 20-24, 2018).
Third Generation Partnership Project, "Technical Specification Group Radio Access Network; NR; Physical channels and modulation (Release 15)," 3GPP TS 38.211 V15.2.0 (Jun. 2018).
Third Generation Partnership Project, "Technical Specification Group Radio Access Network; NR; Physical channels and modulation (Release 15)," 3GPP TS 38.211 V15.6.0 (Jun. 2019).
Third Generation Partnership Project, "Technical Specification Group Radio Access Network; NR; Multiplexing and channel coding (Release 15)," 3GPP TS 38.212 V15.6.0 (Jun. 2019).
Third Generation Partnership Project, "Technical Specification Group Radio Access Network; NR; Multiplexing and channel coding (Release 15)," 3GPP TS 38.212 V15.2.0 (Jun. 2018).
Third Generation Partnership Project, "Technical Specification Group Radio Access Network; NR; Physical layer procedures for control (Release 15)," 3GPP TS 38.213 V15.2.0 (Jun. 2018).
Third Generation Partnership Project, "Technical Specification Group Radio Access Network; NR; Physical layer procedures for control (Release 15)," 3GPP TS 38.213 V15.6.0 (Jun. 2019).
Third Generation Partnership Project, "Technical Specification Group Radio Access Network; NR; Physical layer procedures for data (Release 15)," 3GPP TS 38.214 V15.2.0 (Jun. 2018).
Third Generation Partnership Project, "Technical Specification Group Radio Access Network; NR; Physical layer procedures for data (Release 15)," 3GPP TS 38.214 V15.6.0 (Jun. 2019).

(56) References Cited

OTHER PUBLICATIONS

Third Generation Partnership Project, "Technical Specification Group Radio Access Network; NR; Medium Access Control (MAC) protocol specification (Release 15)," 3GPP TS 38.321 V15.2.0 (Jun. 2018).

Third Generation Partnership Project, "Technical Specification Group Radio Access Network; NR; Medium Access Control (MAC) protocol specification (Release 15)," 3GPP TS 38.321 V15.6.0 (Jun. 2019).

Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.2.0 (Jul. 2018).

Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.6.0 (Jun. 2019).

Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.0 (Jun. 2018).

Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.2 (Jun. 2018).

Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.6.0 (Jun. 2019).

Third Generation Partnership Project, "Technical Specification Group Radio Access Network; NR; Radio Resource Control (RRC) protocol specification (Release 15)," 3GPP TS 38.331 V15.6.0 (Jun. 2019).

Third Generation Partnership Project, "Technical Specification Group Radio Access Network; NR; Radio Resource Control (RRC) protocol specification (Release 15)," 3GPP TS 38.331 V15.2.1 (Jun. 2018).

Third Generation Partnership Project, "Technical Specification Group Radio Access Network; NR; Requirements for support of radio resource management (Release 15)," 3GPP TS 38.133 V15.6.0 (Jun. 2019).

Third Generation Partnership Project, "Technical Specification Group Radio Access Network; NR; Requirements for support of radio resource management (Release 15)," 3GPP TS 38.133 V15.2.0 (Jun. 2018).

Third Generation Partnership Project, "Technical Specification Group Radio Access Network; NR; Requirements for support of radio resource management (Release 16)," 3GPP TS 38.133 V16.0.0 (Jun. 2019).

Third Generation Partnership Project, "Technical Specification Group Radio Access Network; NR; User Equipment (UE) radio transmission and reception; Part 1: Range 1 Standalone (Release 16)," 3GPP TS 38.101-1 V16.0.0 (Jun. 2019).

Third Generation Partnership Project, "Technical Specification Group Radio Access Network; NR; User Equipment (UE) radio transmission and reception; Part 1: Range 1 Standalone (Release 15)," 3GPP TS 38.101-1 V15.6.0 (Jun. 2019).

Third Generation Partnership Project, "Technical Specification Group Radio Access Network; NR; User Equipment (UE) radio transmission and reception; Part 1: Range 1 Standalone (Release 15)," 3GPP TS 38.101-1 V15.2.0 (Jun. 2018).

Zte et al., "Remaining issues for data resource allocation," 3GPP TSG RAN WG1 Meeting #92, R1-1801629, Athens, Greece (Feb. 26-Mar. 2, 2018).

Ericsson, "Corrections for CSI Reporting," 3GPP TSG RAN WG1 Meeting AH 1801, R1-1800697, Vancouver, Canada (Jan. 22-26, 2018).

LG Electronics, "Remaining issues on UL data transmission procedure," 3GPP TSG RAN WG1 Meeting AH 1801, R1-1800382, Vancouver, Canada (Jan. 22-26, 2018).

Qualcomm Incorporated, "Maintenance for Carrier Aggregation and Bandwidth Parts," 3GPP TSG RAN WG1 Meeting #94, R1-1809429, Gothenburg, Sweden (Aug. 20-24, 2018).

* cited by examiner

METHODS AND APPARATUS FOR WIRELESS TRANSMIT/RECEIVE UNIT (WTRU) POWER CONTROL

CROSS-REFERENCE TO RELATED APPLICATIONS

This application is the U.S. National Stage, under 35 U.S.C. § 371, of International Application No. PCT/US2019/047429 filed Aug. 21, 2019, which claims the benefit of U.S. Provisional Application No. 62/720,547, filed Aug. 21, 2018, U.S. Provisional Application No. 62/735,939, filed Sep. 25, 2018, U.S. Provisional Application No. 62/752,797, filed Oct. 30, 2018, U.S. Provisional Application No. 62/753,597, filed Oct. 31, 2018, U.S. Provisional Application No. 62/840,935, filed Apr. 30, 2019, and U.S. Provisional Application No. 62/886,083, filed Aug. 13, 2019, the contents of which are incorporated herein by reference.

BACKGROUND

Next generation air interfaces, including further evolution of LTE Advanced Pro and New Radio (NR), are expected to support a wide range of use cases. Such use cases may have varying service requirements, such as low overhead low data rate power efficient services (mMTC), ultra-reliable low latency services (URLLC) and high data rate mobile broadband services (eMBB)), for diverse WTRU capabilities, such as low power low bandwidth, very wide bandwidth (e.g., 80 Mhz), and high frequency (e.g., >6 Ghz). Such use cases may have different spectrum usage models, such as licensed or unlicensed/shared, and may operate under various mobility scenarios, such as stationary/fixed or high speed trains using an architecture that is flexible enough to adapt to diverse deployment scenarios, such as standalone, non-standalone with assistance from a different air interface, centralized, virtualized, or distributed over ideal/non-ideal backhaul.

SUMMARY

Methods and apparatus for wireless transmit/receive unit (WTRU) power control are described. A method includes receiving a time domain resource allocation (TDRA) list configuration including entries, each including a resource allocation that includes a slot offset value. L1 signaling is received indicating a minimum slot offset value. Downlink control information (DCI) is decoded on a physical downlink control channel in a slot. An index is obtained from the decoded DCI, identifying an entry in the TDRA list. A particular slot offset value identified by the index is retrieved from the TDRA list and compared with the minimum slot offset value. If the particular slot offset value is less than the minimum slot offset value, the entry is invalid. If the particular slot offset value is greater than or equal to the minimum slot offset value, a physical downlink shared channel is received.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
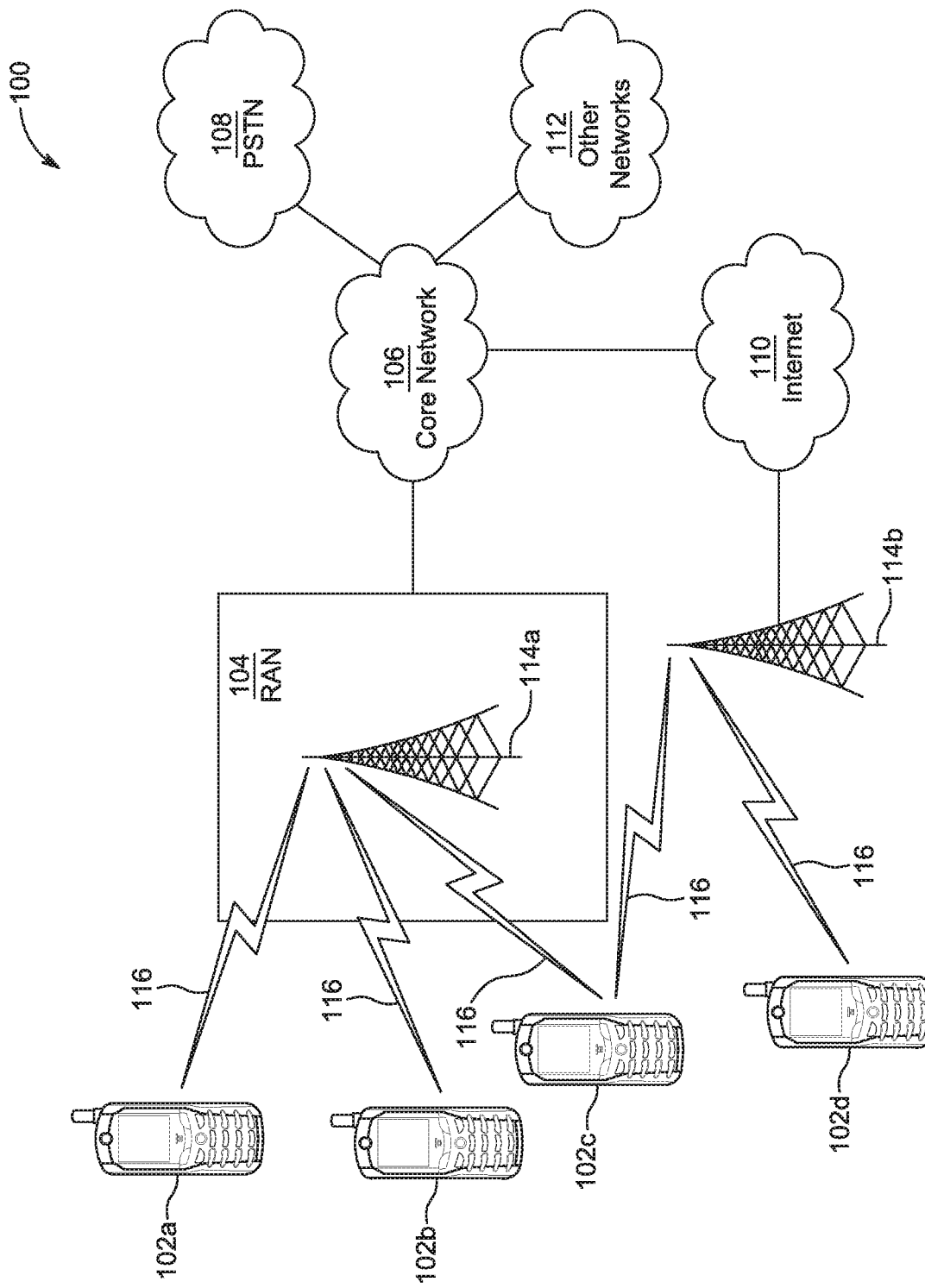
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN).

In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
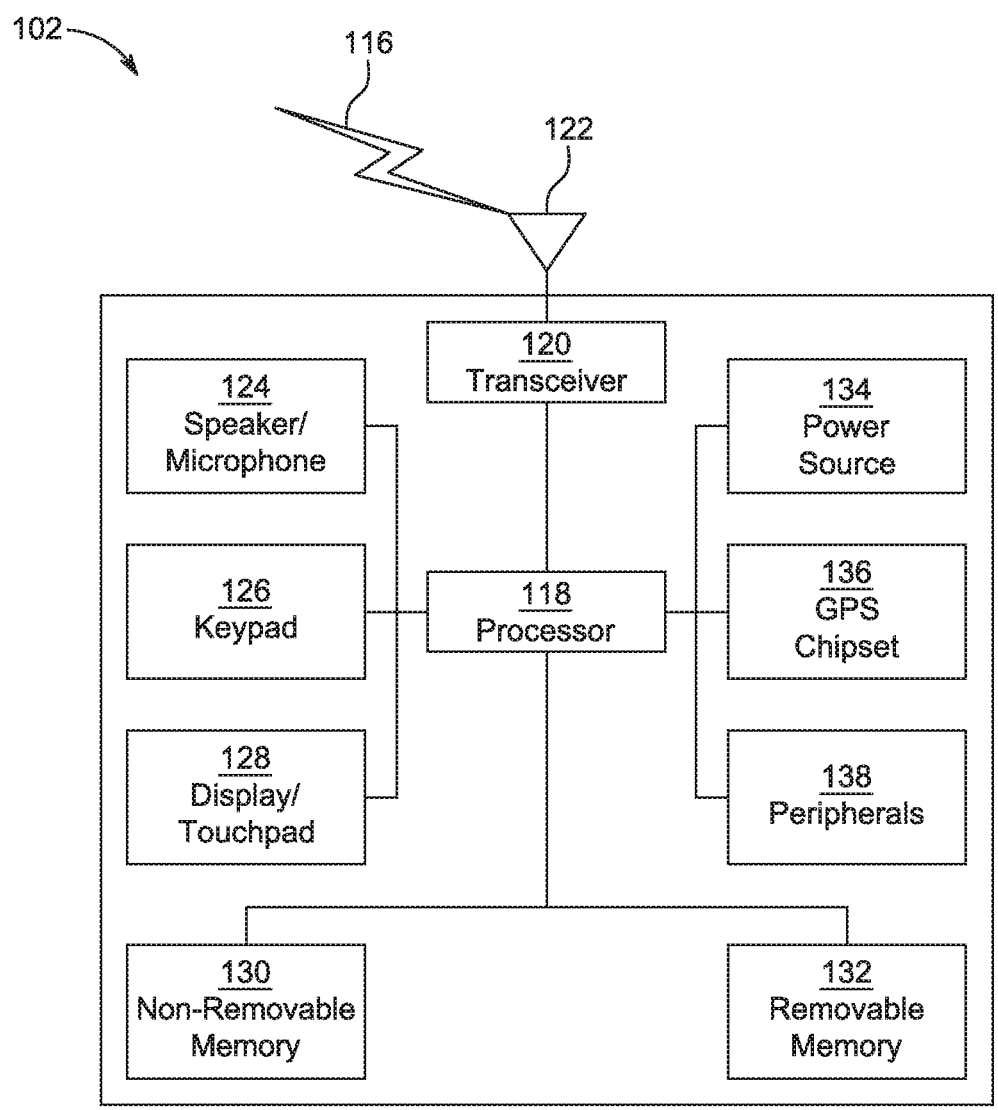
FIG. 1B is a system diagram illustrating an example wireless transmit/receive unit (WTRU) that may be used within the communications system illustrated in FIG. 1A according to an embodiment.
Figure 1C:
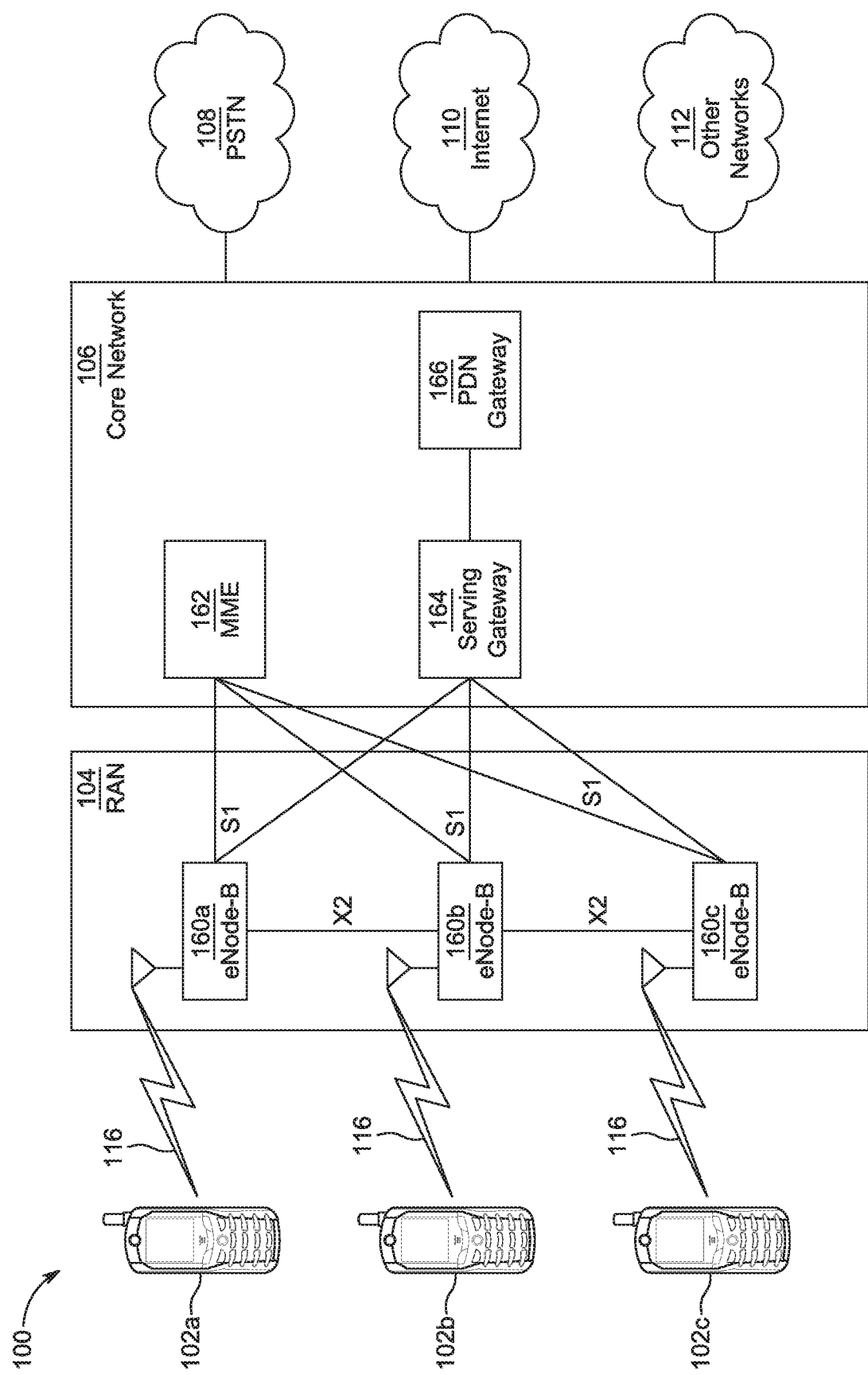
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
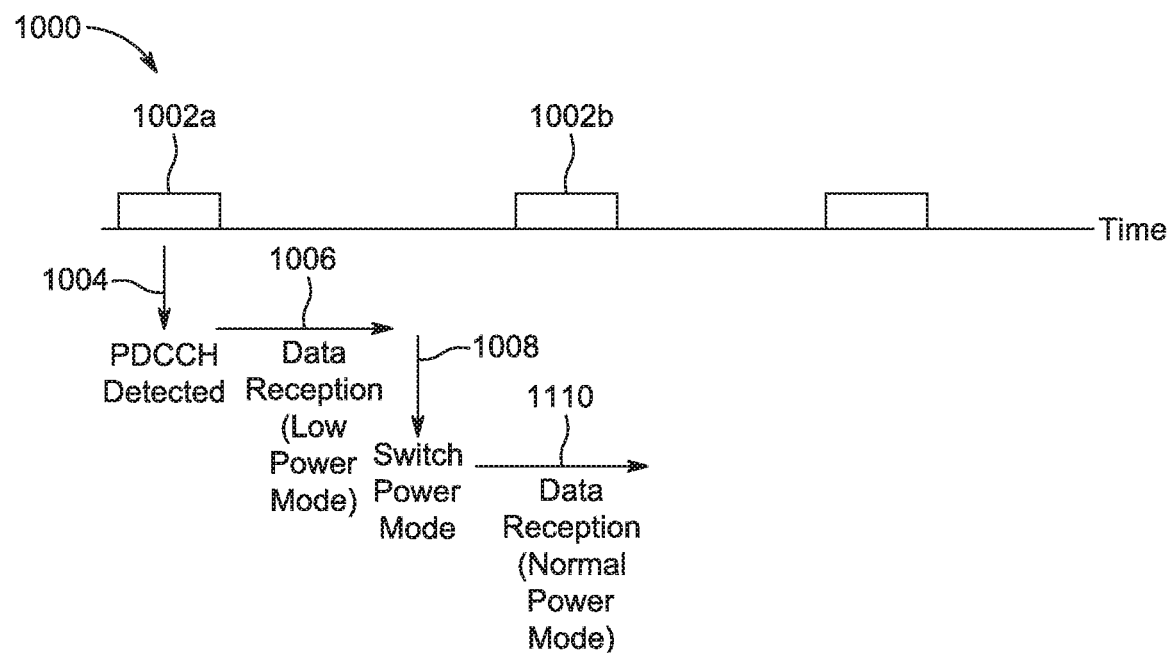
FIG. 10 is a signal diagram of an example of power mode switching between ON durations in different DRX cycles.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
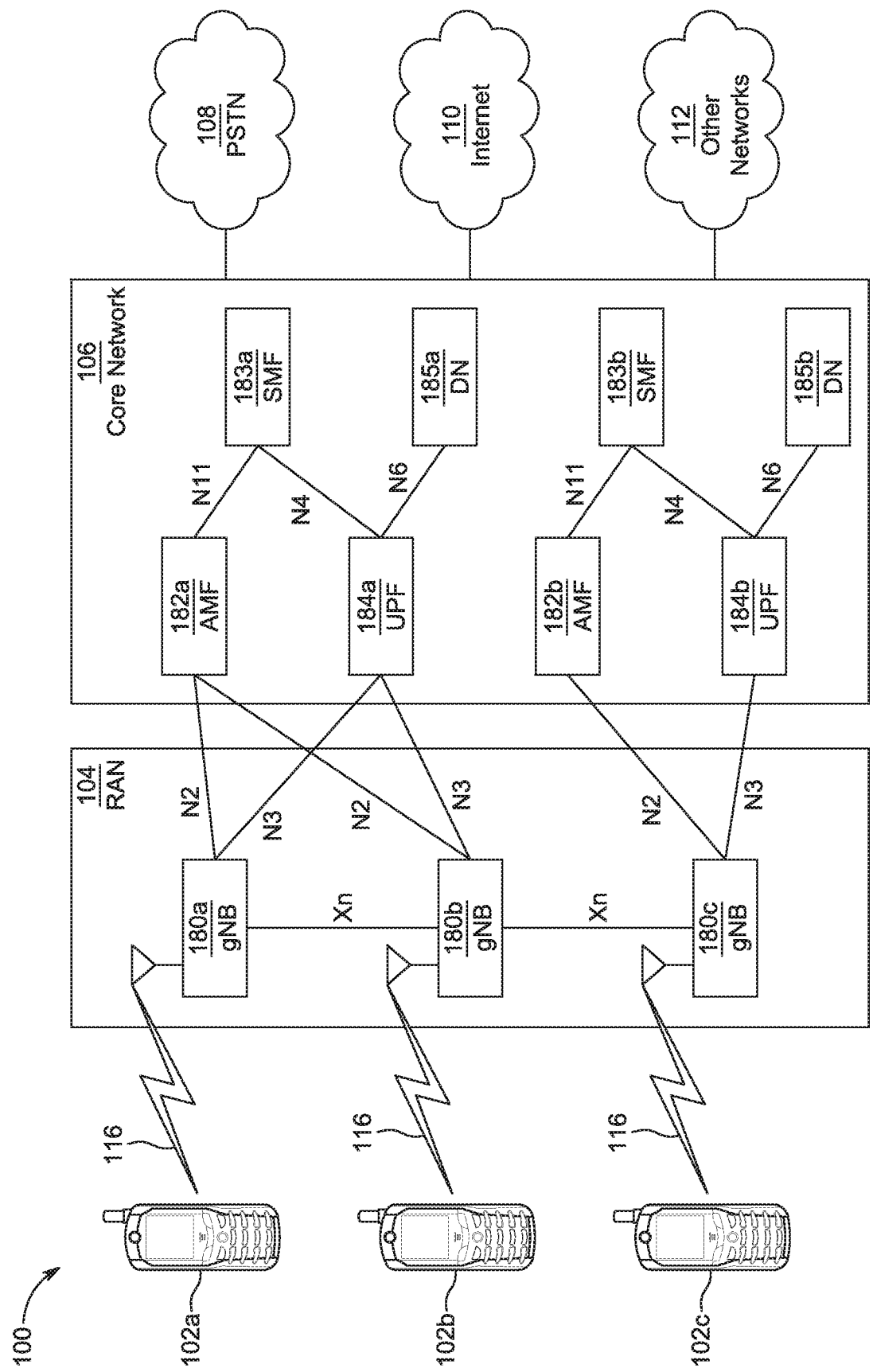
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

One or more networks are described herein and, in embodiments, may refer to one or more gNBs that may each be associated with one or more transmission/reception points (TRPs) or any other node in a RAN.

The receiver of a WTRU may need to implement automatic frequency control (AFC) to maintain the frequency of its local oscillator tuned to the oscillator used at the transmitter side. This function may be supported by various synchronization signals (SSs) and/or reference signals (RSs). Maintaining coarse AFC may be necessary for coherent detection of a physical downlink control channel (PDCCH) and any incoming scheduled DL transmissions. In LTE, coarse AFC may use the PSS/SSS synchronization codes that may be present every 5 ms and the CRS that may be present on at least 2 OFDM symbols per 1 ms interval. In NR, coarse AFC may use the synchronization signal block (SSB), which may have a periodicity of at least 20 ms. An NR device may also exploit a CSI-reference signal (CSI-RS) if configured and activated or a demodulation reference signal (DMRS), which may be present only during a DL transmission. A special signal, the tracking reference signal (TRS), may also be configured and activated for an NR device to facilitate coarse AFC. The TRS may be configured as a non-zero power CSI-RS resource set with a recurrence period of 10, 20, 40 or 80 ms. It may be present on three resource elements (REs) in a resource block (RB) and in two OFDM symbols out of 14 in two consecutive timeslots. A reduced density TRS only using the first timeslot may also be configurable.

Figure 2:
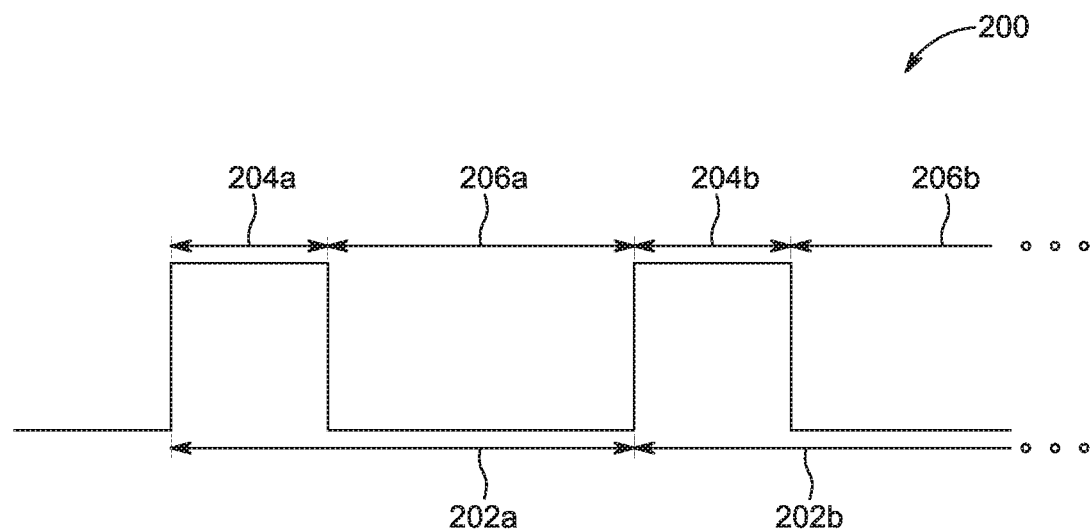
FIG. 2 is a diagram of an example of discontinuous reception (DRX)

FIG. 2 is a diagram 200 of an example of discontinuous reception (DRX). FIG. 2 shows a full DRX cycle 202a and a portion of a second DRX cycle 202b. In the example illustrated in FIG. 2, each DRX cycle 202a, 202b includes an ON duration 204a, 204b and an OFF duration 206a, 206b. A WTRU may monitor a DL control channel, such as a PDCCH, during ON durations 204a, 204b and enter a sleep state (e.g., not monitor the PDCCH) during OFF durations 206a, 206b. While only two DRX cycles 202a, 202b are illustrated in FIG. 2, a WTRU configured for DRX may periodically repeat the DRX cycle over any number of cycles.

As illustrated in the example of FIG. 2, a WTRU may begin a DRX cycle with an ON duration. An ON duration timer may be used to determine a consecutive number of PDCCH occasions that that a WTRU may need to monitor or decode, such as after wakeup from the DRX cycle or at the beginning of a DRX cycle. A DRX inactivity timer may be used to determine when to switch to the OFF duration. A DRX retransmission timer may be used to determine a consecutive number of PDCCH occasions to monitor when retransmission is expected by the WTRU. A DRX retransmission timer may be used to determine a maximum duration until a DL retransmission or grant for UL retransmission may be received.

During OFF durations, such as OFF durations 206a, 206b, in addition to not monitoring a DL channel, such as the PDCCH, a WTRU may not measure or report channel state information (CSI) in a subframe configured to measure and/or report a periodic CSI reporting. In embodiments, a WTRU may need to monitor the PDCCH or PDCCH occasions during an active time that may occur during an ON duration or an OFF duration. In other embodiments, an active time may begin during an ON duration and continue during an OFF duration. An active time may include the time during which at least one of the following is true: any DRX timer, such as an ON duration timer, an inactivity timer, a retransmission timer, or a random access contention resolution timer, is running; a scheduling request is sent (e.g., on the physical uplink control channel (PUCCH); and a PDCCH indicating a new transmission addressed to the cell radio network identifier (C-RNTI) of a MAC entity of the WTRU has not been received after successful reception of a random access response for a random access preamble not selected by the MAC entity among the contention-based random access preambles.

A DRX cycle, such as DRX cycles 202a, 202b, may be a short DRX cycle or a long DRX cycle. In embodiments, a WTRU may use a short DRX cycle for a period of time and then a long DRX cycle. A DRX inactivity timer may be used to determine a time duration (e.g., in terms of transmission time interval (TTI) after a PDCCH occasion in which a successfully decoded PDCCH indicates a UL or DL user data transmission. A PDCCH occasion may be a time period that may contain a PDCCH, such as a symbol, a set of symbols, a slot, or a subframe. A DRX short cycle may be the first DRX cycle that a WTRU enters after expiration of the DRX inactivity timer. The WTRU may be in the short DRX cycle until the expiration of a DRX short cycle timer. When the DRX short cycle timer is expired, the WTRU may use a long DRX cycle. The DRX short cycle timer may be used to determine the number of consecutive subframes that may follow the short DRX cycle after the DRX inactivity timer has expired.

In RRC connected mode, a WTRU may use connected mode DRX (C-DRX). When an LTE or NR device is in C-DRX, it may be configured with a DRX cycle. Configuration of separate short and long DRX cycles is possible. The C-DRX cycles may be set in the range of several ten to several hundreds of milliseconds. A WTRU may wake up at determined time instants, such as during the DRX ON duration, and attempt to decode the PDCCH in the first timeslot of the DRX ON duration. If no message is received or decoded in the timeslot, the WTRU may decrease a configurable ON duration counter and may again attempt to decode the PDCCH in the next PDCCH monitoring opportunity on an active CORESET and for the configured search spaces. When the counter reaches zero, the WTRU may return to a sleep state and will not attempt to decode a PDCCH again until the next DRX ON duration.

To be able to decode the PDCCH at the beginning (e.g., the first timeslot) of a C-DRX ON duration, a WTRU may need to have achieved at least coarse AFC. The DMRS contained inside the RBs of the active bandwidth part (BWP) carrying the PDCCH for the device may only be exploited to fine-tune AFC during ongoing reception of that PDCCH and for subsequent timeslots. In LTE, a WTRU may achieve coarse AFC by waking up a short period of time before the start of a DRX ON duration and measuring the cell specific reference signal (CRS) available in most subframes.

In embodiments, wake-up signals (WUSs) and go-to-sleep signals (GOSs) may be used, for example, in conjunction with a DRX operation. A WUS/GOS may be associated with one or more DRX cycles and may be transmitted and/or received prior to an associated time or part of an associated DRX cycle.

Figure 3:
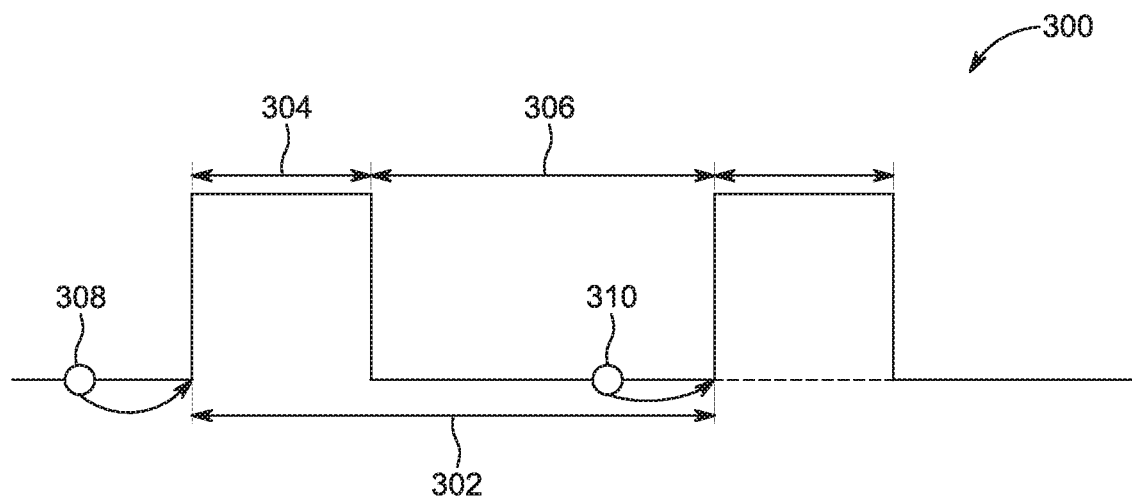
FIG. 3 is a diagram of an example DRX cycle with wake up and go-to-sleep signaling.

FIG. 3 is a diagram 300 of an example DRX cycle 302 with WUS and GOS. In the example illustrated in FIG. 3, a WTRU may receive a WUS 308 and, in response, may wake up to monitor a downlink channel in the associated ON duration 304. In embodiments, a WTRU receiving a WUS may wake up and monitor the downlink channel in ON durations for one or more DRX cycles. The WTRU may also receive a GOS 310 and, in response, may not monitor the downlink channel in an associated OFF duration 306. In embodiments, a WTRU receiving a GOS may not monitor the downlink channel for one or more DRX cycles and may remain in a sleep mode. In embodiments, either a WUS or a GOS, or both a WUS and a GOS, may be implemented.

In NR, a WTRU may be configured with one or more CSI resource configurations, such as non-zero-power (NZP) CSI resources. Each CSI resource configuration may include one or more NZP-CSI-RS resource sets. Each NZP CSI resource may be for a semi-persistent resource type and BWP-ID 2. The CSI resource configuration 420 may be associated with CSI reporting configurations 430, 431 and 433, the CSI resource configuration 421 may be associated with the CSI reporting configurations 432 and 434, and the CSI reporting configuration 422 may be associated with the CSI reporting configuration 435.

A WTRU may receive an aperiodic CSI request in a slot n, and its associated aperiodic CSI-RS (or NZP-CSI-RS) resource set may be located in a slot n+x, where x may be at least one of {0, 1, 2, 3, 4}. Table 1 below shows an example of a CSI request field and its associated reporting and resource settings.

TABLE 1

| CSI request field in DCI (up to 64 states) | Associated reporting setting (each reporting setting may include up to 16 reporting configurations) | Associated aperiodic NZP-CSI-RS resource set ID | Slot offset of the associated NZP-CSI-RS resource set |
|---|---|---|---|
| 000 | — | — | — |
| 001 | Reporting configuration #1 | 1 | 0 |
| 010 | Reporting configuration #2 | 2 | 0 |
| . . . | . . . | . . . | . . . |
|  | Reporting configuration #x | 2 | 1 |
| 011 | Reporting configuration #k | 0 | 3 |
|  | Reporting configuration #k + 1 | 0 | 3 |
| . . . | . . . | . . . | . . . |
| 110 | Reporting configuration #y | 0 | 0 |
| 111 | Reporting configuration #x | 15 | 1 | set may include up to 64 NZP-CSI-RS resources. A triggering offset for an aperiodic NZP-CSI-RS resource may be configured per NZP-CSI-RS resource set. A WTRU may be further configured with one or more CSI reporting configuration. Each CSI reporting configuration may be associated with a CSI resource configuration for channel measurement. An associated BWP-ID and resource type (e.g., aperiodic, periodic, or semi-persistent) may be configured per CSI resource configuration.

Figure 4:
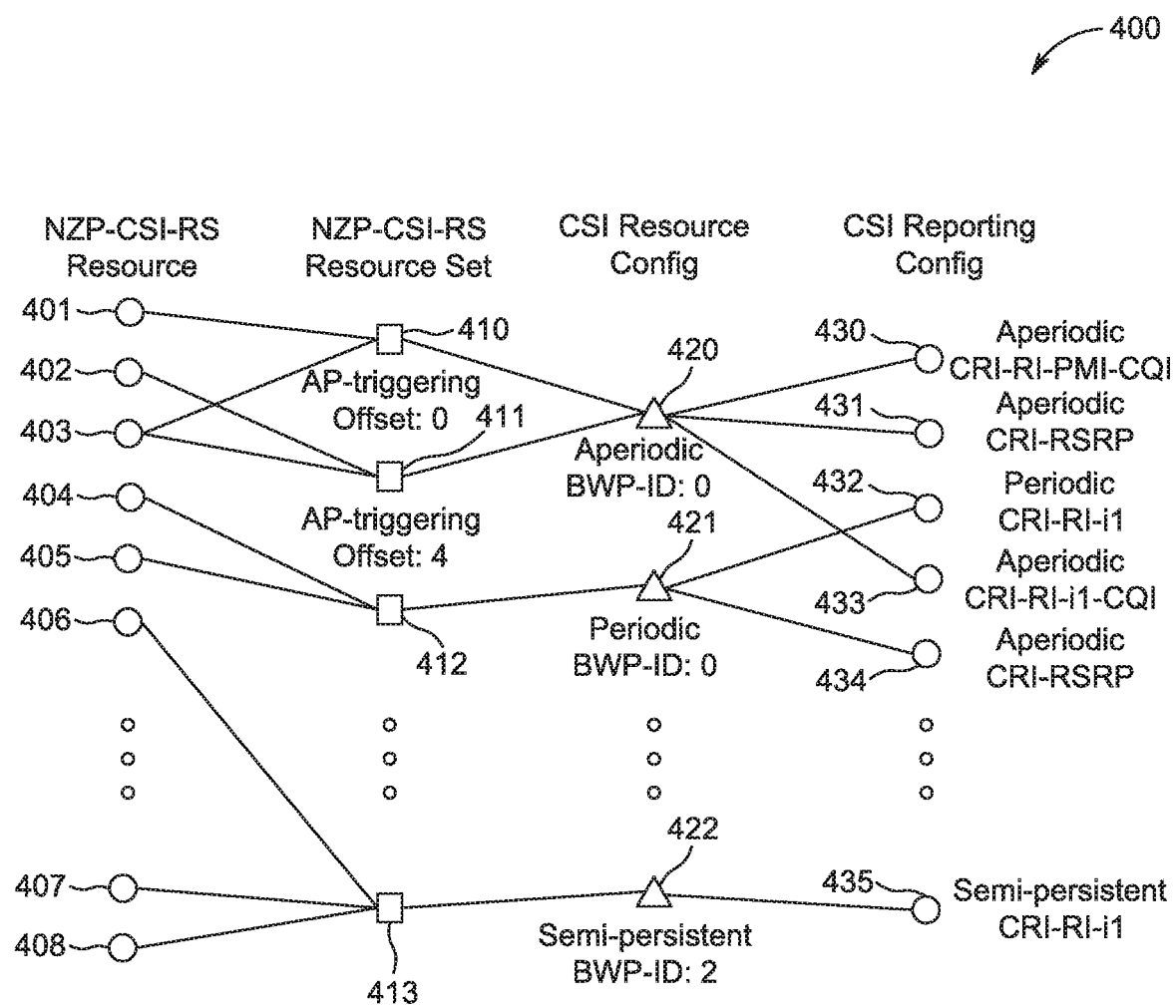
FIG. 4 is a diagram of example channel state information (CSI) resource and CSI reporting configurations.

FIG. 4 is a diagram 400 of example CSI resource and CSI reporting configurations and shows the association between various NZP-CSI-RS resources, NZP-CSI-RS resource sets, CSI resource configurations, and CSI reporting configurations. In the example illustrated in FIG. 4, a WTRU is configured with eight NZP-CSI-RS resources 401, 402, 403, 404, 405, 406, 407 and 408. The ellipsis in FIG. 4, however, indicates that a WTRU may be configured with any number of NZP-CSI-RS resources. NZP-CSI-RS resource 401 includes resource set 410, NZP-CSI-RS resource 402 includes resource set 411, NZP-CSI-RS resource 403 includes resource sets 410 and 411, NZP-CSI-RS resources 404 and 405 each includes resource set 412, and NZP-CSI-RS resources 406, 407 and 408 each includes resource set 413. The resource set 410 may have an AP-triggering offset of 0, and the resource set 411 may have an AP-triggering offset of 4. The remaining resource sets (e.g., 412 and 413) may also be configured with different AP-triggering offsets.

The resource sets 410 and 411 may be associated with CSI resource configuration 420, the resource set 412 may be associated with CSI resource configuration 421, and the resource set 413 may be associated with the CSI resource configuration 422. The CSI resource configuration 420 may be for an aperiodic resource type and BWP-ID 0, the CSI resource configuration 421 may be for a periodic resource type and BWP-ID 0, and the CSI resource configuration 422

Each CSI request field may be associated with a reporting setting (or CSI associated report configuration information), and the reporting setting may include up to 16 reporting configurations. Each reporting configuration may be considered as a CSI reporting configuration. On a condition that more than one aperiodic NZP-CSI-RS resource set is associated with a reporting configuration, a single aperiodic NZP-CSI-RS resource set may be selected for the CSI request field. Each aperiodic NZP-CSI-RS resource set may be configured with a slot offset value from the slot where a WTRU received the CSI request.

In NR, a WTRU may be configured with a set of slot offsets for physical downlink shared channel (PDSCH) scheduling from the slot where the WTRU received scheduling DCI. A WTRU may be configured with PDSCH-TimeDomainResourceAllocationList (or PDSCH-TDRA list), which may include up to a number (e.g., 16) of PDSCH-TDRA configurations. Each PDSCH-TDRA configuration may include: a slot offset value (e.g., k0) which may be, for example one of {0, 1, . . . , 32}, a mapping type which may be, for example one of {typeA, typeB}, and/or a starting symbol and length (e.g., SLIV) which may be, for example one of {0, 1, . . . , 127}. The k0 value may determine the slot offset for the PDSCH reception from the slot where the scheduling DCI is received. For example, if a WTRU receives the DCI for a PDSCH in a slot #n, it may receive the PDSCH in the slot #n+k0. The mapping type may determine the slot length. For example, type A may be used for a normal slot length and type B may be used for a sub-slot length. The SLIV may determine the starting symbol and the length of the PDSCH within a slot. In the examples and embodiments described herein, PDSCH may be replaced by PUSCH and slot offset k0 may be replaced by slot offset k2. For example, A WTRU may be configured with PUSCH-TimeDomainResourceAllocationList (or PUSCH-TDRA list), which may include up to a number (e.g., 16) of PUSCH-TDRA configurations. Each PUSCH-TDRA configuration may include: a slot offset value (e.g., k2) which may be, for example one of {0, 1, . . . , 32}, a mapping type which may be, for example one of {typeA, typeB}, and/or a starting symbol and length (e.g., SLIV) which may be, for example one of {0, 1, . . . , 127}. The k2 value may determine the slot offset for the PUSCH transmission from the slot where the scheduling DCI is received.

The receiver of a wireless communication device may be equipped with multiple RF chains. Each such chain may include one or more antenna elements plus analog circuitry (e.g. low-noise amplifier, filters, oscillator, mixer, and/or analog-to-digital converter). Reception using multiple RF chains may increase performance through diversity and/or spatial processing. Minimum performance requirements for RF sensitivity assume that a WTRU is equipped with a minimum number of Rx antenna ports.

For operation in frequency range 1 (below 6 GHz), many NR devices will use four Rx RF chains for reception of DL signals and channels from the gNB to, for example, provide robust link performance and efficiently exploit spatial multiplexing to achieve high DL spectral efficiency. Minimum reception requirements using the assumption of four Rx RF chains may be set for several NR operating bands. Specialized types of NR devices, such as those intended for V2X type of applications, may be expected to only use two Rx RF chains. Dual-mode LTE/NR devices sharing common RF may also be expected to follow LTE requirements for DL reception. For operation in frequency range 2 (mmWave), many NR devices will implement analog beamforming support by using multiple RF panels. Among other advantages, beamforming may allow for improved link budgets when operating at mmWave frequencies.

In existing NR technology, similar to LTE, the number of Rx antennas to use by a device for DL reception is dependent on the operating band. Device performance requirements may be set by assuming the availability of the mandated number of device Rx antennas. A device may advertise support for a set of LTE or NR operating bands to the network, possibly in conjunction with supported band combinations for carrier-aggregation or dual-connectivity. This may implicitly indicate the support of the mandated number of Rx chains on the device for the operating band.

Power consumption for active RF components, such as oscillators, low noise amplifiers (LNAs) and analog-to-digital (A/D) converters may scale linearly with the number of active Rx chains in a device. The digital baseband (BB) may implement low-level functions such as channel sample buffering, spatial layer de-mapping and channel estimation. Power consumption in the low-level digital BB may also increase with the number of active Rx paths. Other high-level functions in the digital BB, such as transport channel processing and channel decoding, may see an increase in power consumption in the presence of reception using multiple active RF chains in the device, but primarily as a function of the transmitted data rate, which may be high even with a lower number of Rx chains if the signal to interference and noise ratio (SINR) is good enough.

WTRU power consumption is expected to increase in NR and beyond as higher carrier frequencies, wider bandwidths and advanced MIMO schemes are deployed. For example, transceiver circuitry, including RF chains, consumes a considerable amount of power, for example as compared to baseband processing. Even when configured with C-DRX, data may not be received for a significant period of time while a WTRU is monitoring the PDCCH during active time. As a result, a WTRU equipped with multiple receive (Rx) chains may waste a significant amount of power attempting to receive while no data is being transferred. If a WTRU implementation attempts to save power by turning off some Rx chains during active time, there is risk that the WTRU may fail to meet performance requirements because the network may assume that it is always prepared to receive the PDCCH and PDSCH using all Rx chains. Conventional power saving mechanisms do not allow dynamic turn on and off of RF chains or other parts of the transceiver circuitry. Embodiments are described herein that may allow a WTRU to safely reduce its number of Rx chains when possible without impacting performance.

Additionally, signals needed to achieve coarse AFC may not be generally available just before the start of a WTRU's on-duration. As a result, an NR WTRU may need to wake up in between on-durations for the sole purpose of detecting the appropriate signals (e.g. SSB). This may be less efficient than the WTRU just before the beginning of an ON duration when considering practical transition times for switching the related circuitry on and off. Embodiments are described herein that may enable maintenance of coarse AFC while reducing the number of wake-up intervals not related to the actual DRX ON duration.

Further, in, for example, R15 NR, DRX may be configured with, at most, a single DRX configuration. The sleep opportunity is purely based on time domain. Further, the WTRU may spend a considerable amount of time monitoring the PDCCH without being scheduled. In R15, during the ON duration, the WTRU is required to monitor all CORESETs and all search spaces in the active BWP each ON duration, which may result in a significant number of blind decodes and consume a substantial amount of device power. A potential tool to reduce the number of blind decodes using the R15 framework may be to configure the default BWP with a single search space, given that a WTRU in DRX is likely to be in the default BWP due to the expiry of the inactivity timer, and rely on sending a DCI with a BWP switch upon scheduling the WTRU during a given ON duration. However, given that the RACH and SR functionalities rely on the default BWP, and given that the WTRU may resort to the default BWP if the BWP inactivity timer is short, the scheduling capacity may be limited if the default BWP is limited to one search space or one CORESET. Embodiments are described herein that may address this.

Embodiments described herein provide for a number of different radio performance states, radio performance modes, power modes, or transmission modes. One of ordinary skill in the art will understand that these or similar terms may be used interchangeably throughout. In embodiments, a WTRU may be configured to operate according to one of a set of possible radio performance states, radio performance modes, power modes, or transmission modes. A radio performance state, radio performance mode, power mode, or transmission mode may, for example, determine a set of maximum performance metrics and/or capabilities applicable to the WTRU at a given point in time.

As described above, a WTRU may be configured with a set of PDSCH-TDRA (e.g., a PDSCH-TDRA list). A WTRU may receive an indication of one of the PDSCH-TDRA in a DCI for PDSCH scheduling. If the indicated PDSCH-TDRA is k0=0, for example, excess WTRU power consumption may be required as the WTRU may need to buffer the PDSCH region in a slot where the PDCCH is monitored for a DCI with C-RNTI or configured scheduling RNTI (CS-RNTI).

In some embodiments, a power mode may determine which subset of PDSCH-TDRA entries in the configured PDSCH-TDRA list may be valid or present in the associated DCI for a PDSCH scheduling. For example, if a WTRU is in a first power mode (e.g., normal mode), the WTRU may assume that all PDSCH-TDRA entries in the PDSCH-TDRA list may be used when the WTRU monitors a PDCCH in a slot. If a WTRU is in a second power mode (e.g., power saving mode), the WTRU may assume that the PDSCH-TDRA entries with k0=0 may be not used when the WTRU monitors a PDCCH in a slot or the WTRU may ignore the PDSCH-TDRA entries with k0=0

In some embodiments, a power mode may determine which subset of aperiodic CSI reporting trigger states in a configured CSI reporting trigger state list may be valid (or present) in the associated DCI for aperiodic CSI reporting. For example, if a WTRU is in a first power mode, the WTRU may assume or expect that all CSI reporting trigger states in the configured CSI reporting trigger state list may be valid when the WTRU monitors a PDCCH for aperiodic CSI reporting. If a WTRU is in a second power mode, the WTRU may assume or expect that the CSI reporting trigger states associated with an aperiodic NZP-CSI-RS resource set with slot offset less than a threshold may be invalid. As used herein, invalid and unusable, in the context of a CSI reporting trigger, may be used interchangeably, and unusable is an example of invalid. In some embodiments, the threshold value (Ttre) may be a predefined number, such as '1'. In some embodiments, the threshold value may be determined based on numerology. For example, a first threshold value may be used for a first subcarrier spacing (e.g., Ttre=1 for 15 kHz SCS), and a second threshold value may be used for a second subcarrier spacing (e.g., Ttre=3 for 60 kHz SCS).

In some embodiments, a power mode may determine a minimum slot offset value of NZP-CSI-RS resource sets associated with one or more configured aperiodic CSI reporting trigger states. In some embodiments, a power mode may determine the maximum transmission rank and/or maximum modulation order for a PDSCH. For example, if a WTRU is in a first power mode, the WTRU may expect to receive the PDSCH with a maximum transmission rank ($R_{max}$) and/or a maximum modulation order ($M_{max}$) based on the WTRU's capability when the WTRU monitors an associated PDCCH in a slot. If a WTRU is in a second power mode, the WTRU may assume or expect to receive the PDSCH with a limited maximum transmission rank ($R_{limit}$, $R_{max}>R_{limit}$) and/or limited maximum modulation order ($M_{limit}$, $M_{max}>M_{limit}$) when the WTRU monitors an associated PDCCH in a slot.

In some embodiments, a power mode may determine a set of aggregation levels and/or a number of candidates for an aggregation level. For example, if a WTRU is in a first power mode, the WTRU may monitor all aggregation levels and/or its associated number of candidates configured for a search space. If a WTRU is in a second power mode, the WTRU may monitor a subset of aggregation levels and/or number of candidates configured for a search space. In such embodiments, the subset determined based on a first N entry of the decoding candidate for each configured aggregation level may be monitored. N may be a predefined number, configured via a higher layer signaling, or determined by the WTRU. Alternatively or additionally, in such embodiments, a maximum aggregation level within configured aggregation levels may be monitored by the WTRU.

In some embodiments, a power mode may determine an operating frequency bandwidth (e.g., a bandwidth of the active BWP). For example, if a WTRU is in a first power mode, the WTRU may monitor the PDCCH in a first BWP, and if the WTRU is in a second power mode, the WTRU may monitor the PDCCH in a second BWP. The first BWP may be wider than the second BWP.

In some embodiments, a power mode may be determined based on the search space type or ID. In an example, a first power mode may be used in a first search space type (e.g., any common search space associated with CORESET #0) and a second power mode may be used in a second search space type (e.g., WTRU-specific search space). In another example, a first power mode may be used in a first search space (e.g., search space IDs not associated with a second power mode), and a second power may be used in a second search space for which search space IDs may be configured. Alternatively, the search space IDs for the second power mode may be implicitly determined based on search space IDs associated with a specific CORESET. For example, search spaces associated with CORESET #x may be determined for the second power mode, where the value x may be configured via a higher layer signaling or be predetermined (e.g., 0). Additionally or alternatively, the search space IDs for the second power mode may be implicitly determined based on search space IDs used for a specific RNTI. For example, search spaces for power saving RNTI (PS-RNTI) may be determined for the second power mode, where PS-RNTI may be for the uplink and downlink shared channel (e.g., PDCCH and PUSCH).

In some embodiments, the power mode may be determined based on the search space configuration parameters. In one example, the power mode may be determined based on the periodicity of the search space. For example, a first power mode may be used if the periodicity of a search space is longer or shorter than a threshold, and a second power may be used if the periodicity of a search space is shorter or longer than the threshold. The threshold value may be predetermined or configured via higher layer signaling. In another example, the power mode may be determined based on aggregation level set (or minimum aggregation level, or maximum aggregation level) configured for the search space.

In some embodiments, the power mode may be configured via a higher layer signaling. In other embodiments, the power mode may be indicated by an associated power saving signal, which may indicate whether a WTRU needs to monitor associated PDCCH monitoring occasions or not.

In some embodiments, the power mode may be determined based on WTRU RRC status, which may include RRC idle, RRC connected, and RRC inactive. The first power mode and the second power mode may be used for RRC connected while the first power mode may only be used for RRC idle and RRC inactive.

In some embodiments, the power mode may be determined based on the PDSCH-TDRA entries in the configured PDSCH-TDRA list. For example, if the minimum k0 value of the PDSCH-TDRA entries in the configured PDSCH-TDRA list is less than a threshold, a first power mode may be used. Otherwise, a second power mode may be used. In some embodiments, the threshold value (Ttre) may be '1'. If one or more of PDSCH-TDRA entries in the configured PDSCH-TDRA list include k0=0, a WTRU may use a first power mode. If all PDSCH-TDRA entries in the configured PDSCH-TDRA list have k0>0, a WTRU may use a second power mode. In other embodiments, the threshold value may be determined based on numerology. For example, a first threshold value may be used for a first subcarrier spacing (e.g., Ttre=1 for 15 kHz SCS), and a second threshold value may be used for a second subcarrier spacing (e.g., Ttre=3 for 60 kHz SCS). In some embodiments, the power mode may be determined per bandwidth part (BWP), cell, search space, CORESET, and/or physical channel.

In some embodiments, the minimum slot offset (e.g., minimum k0) value for PDSCH-TDRA entries in the configured PDSCH-TDRA list may be restricted dynamically. For example, a power saving signal may indicate a threshold value for the minimum k0 value for the PDSCH-TDRA entries in the configured PDSCH-TDRA list, and a WTRU may ignore the PDSCH-TDRA entries associated with k0 values smaller than the threshold. For example, a WTRU may ignore a (e.g., any) PDSCH-TDRA entry associated with a k0 value smaller than the threshold.

A WTRU ignoring one or more PDSCH-TDRA entries may mean that the WTRU may not expect to receive such entries, a WTRU may not buffer a PDSCH region of the slots less than the threshold from the slot for the PDCCH monitoring, and/or a WTRU may not receive a PDSCH in the slots less than the threshold from the slot for the PDCCH monitoring.

A WRTU may receive or monitor the power saving signal in predefined or predetermined time location(s) which may be associated with one or more PDCCH monitoring occasions.

A power saving signal may be at least one of a DCI, a reference signal, and/or a preamble.

k0 and k2 are used herein as examples of an offset (e.g., a slot offset). Other parameters may be used and still be consistent with the examples and embodiments described herein. Other offsets such as symbol offsets may be used and still be consistent with the examples and embodiments described herein.

Figure 5:
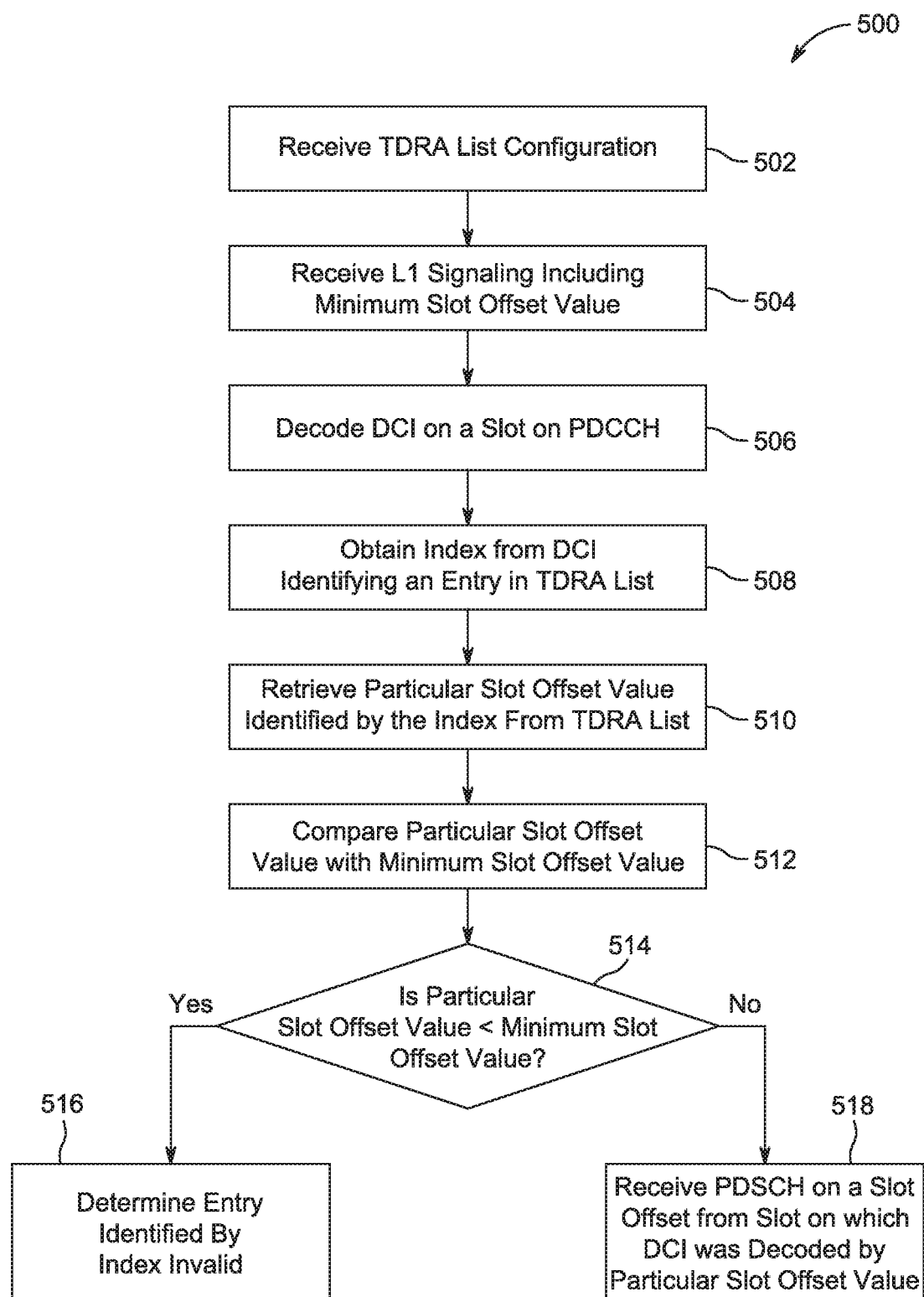
FIG. 5 is a flow diagram of an example method of WTRU power control.

FIG. 5 is a flow diagram of an example method 500 of WTRU power saving. In the example illustrated in FIG. 5, a wireless transmit/receive unit (WTRU) may receive a TDRA list configuration (502). The TDRA list configuration may include multiple entries. Each of the entries may include a resource allocation that may include a slot offset value that may be, for example, for locating a slot in which to receive the PDSCH (or transmit the PUSCH). In embodiments, each of the entries in the TDRA list may include a mapping type and/or a startSymbolAndLength parameter, as described in more detail above.

The WTRU may receive physical layer or layer 1 (L1) signaling, which may include a minimum slot offset value (504). In embodiments, the physical layer or L1 signaling may be used to dynamically provide the WTRU with a minimum slot offset value. The WTRU may, for example when scheduled for PDSCH (or PUSCH), decode a DCI in or on a slot on the PDCCH (506). The WTRU may obtain, from the decoded DCI, an index identifying one of the entries in the TDRA list (508). The WTRU may retrieve, from the TDRA list, a particular slot offset value identified by the index (510).

The WTRU may compare the particular slot offset value with the minimum slot offset value, for example, that was received in the physical layer or L1 signaling (512). If the particular slot offset value is less than the minimum offset value (514), the WTRU may determine that the entry in the TDRA list identified by the index is invalid (516). In embodiments, if the WTRU determines an entry is invalid, the WTRU may not (e.g., does not) receive or buffer the scheduled PDSCH (or transmit the scheduled PUSCH), for example, in a slot offset from the slot on which the DCI was decoded where the slot offset may be the particular slot offset value. If, however, the WTRU determines that the particular slot offset value is greater than or equal to the minimum slot offset value (514), the WTRU may proceed to receive the scheduled PDSCH (or transmit the scheduled PUSCH), for example in the slot offset from the slot which the DCI was decoded (518) where the slot offset may be the particular slot offset value The embodiments described above are described with respect to the PDSCH. However, one of ordinary skill in the art will understand that the same or similar methods may be used for the PUSCH. In embodiments, the minimum slot offset may correspond to a particular radio performance state and, when the WTRU is in a particular radio performance state, it may attempt decoding of the PDSCH or transmitting the PUSCH only if the indicated slot offset (e.g., k0 and/or k2) which may be obtained from the DCI is greater than or equal to the minimum value (e.g., k0min and/or k2min) applicable to the current radio performance state. In embodiments, a minimum value (e.g., k0min or k2min) may be applicable only if the PDCCH is decoded in certain time symbols of the slot or the CORESET. For example, the value may be applicable if the PDCCH is decoded in the last three symbols of a slot. In embodiments, the minimum slot offset (e.g., AP-trigger offset) for NZP-CSI-RS resource sets associated with aperiodic CSI reporting trigger states may be limited or determined based on the minimum slot offset (e.g., k0) of the PDSCH-TDRA in the PDSCH-TDRA list at least in the same BWP. For example, if the minimum k0 value is n1 (e.g., n1=1) in the configured PDSCH-TDRA list, the minimum AP-trigger-offset value may be or may be limited to n2 (e.g., n2=1), where n1 and n2 may be the same values or different values.

If the minimum k0 value is determined for a BWP, a WTRU may not expect that the minimum AP-trigger-offset value is smaller than a threshold (e.g., the minimum k0 value) for the same BWP. If the minimum k0 value is determined for a BWP, a WTRU may ignore or not expect to receive CSI reporting trigger states associated with NZP-CSI-RS resource sets with AP-trigger-offsets smaller than a threshold (e.g., the minimum k0 value) for the same BWP. Ignoring a CSI reporting trigger state may imply that a WTRU may not report CSI for the triggered CSI reporting trigger state. If the minimum k0 value is determined for a BWP, a WTRU may ignore the CSI reporting configurations associated with NZP-CSI-RS resource sets with AP-trigger-offsets smaller than a threshold (e.g., the minimum k0 value) in the triggered CSI reporting trigger state for the same BWP. A CSI reporting trigger state may include or correspond to one or more CSI reporting configurations, and each CSI reporting configuration may be associated with an NZP-CSI-RS resource set. A WTRU may report CSI reporting configurations which are associated with NZP-CSI-RS resource sets with AP-trigger-offsets larger than or equal to the threshold (e.g., minimum k0 value).

Reporting a CSI reporting configuration may correspond to reporting CSI for the reporting configuration. Reporting a CSI reporting configuration may correspond to reporting CSI for, based on (e.g., based on measurement of), and/or using the associated NZP-CSI-RS resource set.

In other embodiments, the minimum AP-trigger-offset value of an NZP-CSI-RS resource set for CSI reporting configurations (or aperiodic CSI reporting trigger states) may be dynamically restricted. For example, a power saving signal may indicate a threshold value for the minimum AP-trigger-offset value for the CSI reporting configurations (or aperiodic CSI reporting trigger states), and a WTRU may ignore a CSI reporting configuration (or aperiodic CSI reporting trigger state) associated with an NZP-CSI-RS resource set with an AP-trigger-offset value smaller than the threshold.

An AP-trigger offset may be an aperiodic trigger offset that may be a slot offset. An AP-trigger offset may be an offset for DL reception or UL transmission. An AP-trigger offset may be an offset from the slot (or other time) of PDCCH reception of the AP-trigger to an RS resource set. An RS resource set may be used for (e.g., may be, may include, or may identify the time and/or frequency resources for) reception and/or measurement (e.g., of a RS). An RS resource set may be used for (e.g., may be, may include, or may identify the time and/or frequency resources for) transmission (e.g., of an RS). A CSI-request is an example of an AP-trigger. An SRS request is an example of an AP-trigger.

NZP-CSI-RS is an example of an RS. Another RS may be used and still be consistent with the examples and embodiments described herein. An NZP-CSI-RS resource set is an example of an RS resource set Another RS resource set may be used and still be consistent with the examples and embodiments described herein. SRS is another example of an RS for which a minimum offset may apply and may be used to restrict SRS transmission to AP-trigger offsets greater than or equal to the minimum offset.

A WTRU that is provided with a k0min, k2min and/or minimum aperiodic CSI-triggering offset may receive, for example in a data scheduling DCI, a k0, k2 and/or an aperiodic CSI-triggering offset that is smaller than the indicated minimum corresponding value. In some embodiments, when a WTRU receives a k0, k2 and/or aperiodic CSI-triggering offset that is smaller than the indicated minimum corresponding value in slot n, the WTRU may set the respective k0min, k2min and/or the minimum aperiodic CSI-triggering offset to a value (e.g. a configured or default value such as 0). The WTRU may set or apply an updated value after (e.g, as soon as) decoding of the scheduling DCI is completed, for example in slot n or a later slot.

In some embodiments, a WTRU may be provided with the value of the minimum slot offset (k0min and/or k2min) and/or minimum aperiodic CSI-RS triggering offset. In such embodiments, if the WTRU receives a DCI, e.g., a downlink grant with a time domain resource assignment pointing to a PDSCH TDRA table entry with k0<k0min, or an uplink grant with a time domain resource assignment pointing to a PUSCH TDRA table entry with k2<k2min, or an uplink grant with a CSI request pointing to a state in the CSI-AperiodicTriggerStateList that indicates an aperiodic triggering offset smaller than the minimum aperiodic triggering offset, then the WTRU may set the minimum aperiodic triggering offset (e.g., k0min and/or k2min) to a value (e.g., a configured or default value). The value may be zero. The WTRU may expect to receive a DCI (e.g., a scheduling DCI such as a DL grant and/or a UL grant) with a time domain resource allocation pointing to any entry in the PDSCH or PUSCH TDRA table. The WTRU may apply the new value of the minimum aperiodic triggering offset (e.g., k0min and/or k2min) in the slot where the DCI is received, or it may apply the new value in a slot later than when the new value was received.

Additionally or alternatively, in embodiments where a WTRU may be provided with the value of the minimum slot grant with a time domain resource assignment pointing to a PDSCH TDRA table entry with k0<k0min, or an uplink grant with a time domain resource assignment pointing to a PUSCH TDRA table entry with k2<k2min, or an uplink grant with a CSI request pointing to a state in the CSI-AperiodicTriggerStateList that further indicates an aperiodic triggering offset smaller than the minimum aperiodic triggering offset, then the WTRU may set the minimum aperiodic CSI-RS triggering offset to a value (e.g., a configured or default value). The value may be zero. The WTRU may expect to receive a DCI (e.g., a scheduling DCI such as a UL grant) with a CSI request pointing to any state in the CSI-AperiodicTriggerStateList. The WTRU may measure the CSI-RS according to the indicated state of CSI-AperiodicTriggerStateList. If the WTRU receives the PDCCH and decodes the DCI by the time the first OFDM symbol of the slot with the CSI-RS resources is received, the WTRU may measure the CSI-RS and feedback the indicated CSI report. The WTRU may also drop the CSI report indicated in the scheduling DCI if it cannot prepare the report.

In the above methods, the default values for k0min, k2min, and minimum aperiodic triggering offset may be the minimum of the all k0, all k2, and all aperiodic triggering offset, respectively, as configured by the RRC in the corresponding lists. In some embodiments, the embodiments described in the two immediately preceding paragraphs may be similarly applicable when the WTRU initiates a random access by transmitting a random access preamble and when the WTRU switches to a new BWP.

In some embodiments, a DCI may be used to both schedule data and indicate to the WTRU to perform at least one power saving technique. For example, a DCI may schedule data and indicate to the WTRU a k0min value using at least 1 bit within the DCI.

In some embodiments, there may be at least two configurations of a DCI, and the configurations may have the same number of bits. For example, DCI Format 1_1 may be configured to have N bits, and, in the first configuration, m (e.g. m=2) of the N bits may be configured to indicate to the WTRU the bandwidth part, and, in the second configuration, the same m bits may be configured to indicate to the WTRU the value of k0min.

In some embodiments, separate search space configurations may be used by the WTRU to interpret the contents of the DCI. At least one search space configuration per DCI configuration may be used.

A WTRU may interpret the attribute indicated by the m bits (e.g., whether the bits indicate an index of a BWP or k0min) based on which time (slot index and/or OFDM symbol(s) indices within the slot) the PDCCH containing the DCI is received. The search space configuration parameters configuring the monitoring slot and slot offset and/or the monitoring symbols within the slot may be used to indicate the time. Further, the WTRU may be configured with two search spaces, and each search space configuration may have the same DCI format and a different monitoringSlotPeriodicityAndOffset parameter. For example, the WTRU may monitor the configured CORESET (e.g. CORESET #1) every p1 slots, and, if a PDCCH is detected, the DCI may indicate the BWP. Further, the WTRU may monitor the configured CORESET every p2 slots, and, if a PDCCH is detected, the DCI may indicate k0min.

Alternatively, the WTRU may interpret the attribute indicated by the m bits (e.g., whether the bits indicate an index of a BWP or k0min) based on which CORESET the PDCCH containing the DCI is received. The search space configuration parameter configuring the CORESET may be used to indicate the control resource elements on which the PDCCH is received. Further, the WTRU may be configured with two search spaces. Each search space configuration may have the same DCI format and a different controlResourceSetId parameter. For example, the WTRU may monitor a first configured CORESET (e.g. CORESET #1), and, if a PDCCH is detected, the DCI may indicate the BWP. Further, the WTRU may monitor a second configured CORESET (e.g. CORESET #2), and, if a PDCCH is detected, the DCI may indicate k0min.

In other embodiments, a combination of at least two of the monitoringSlotPeriodicityAndOffset, monitoringSymbolsWithinSlot, and controlResourceSetId search space configuration parameters may be used to interpret the contents of the received DCI.

In other embodiments, at least one parameter in the search space configuration may be used to interpret the contents of the received DCI. Here, the DCI is the DCI configured in that search space. A first BWP may be configured with a TDRA table by RRC, and the k0min/k2min applicable to the TDRA table for the first BWP may be changed dynamically with L1 signaling. When a WTRU operating in the first BWP receives an indication to switch to a second BWP, the WTRU may set the k0min/k2min values applicable to the TDRA table for the first BWP to the values indicated in the TDRA table configured by the RRC. For example, a TDRA table configured by the RRC for the first BWP may contain k0min=0 slots, and the k0min value may be set to 1 slot by L1-signaling. When the WTRU switches to the second BWP, the k0min applicable to the TDRA table for the first BWP may be set to the value that had been indicated by the RRC, i.e., 0 slots. In other words, all entries of the TDRA table applicable to the first BWP may be usable again. When the WTRU switches back to the first BWP, all entries of the TDRA table applicable to the first BWP are usable.

In embodiments, a WTRU may receive or monitor a power saving signal, such as the L1 signaling described with respect to FIG. 5, in predefined or predetermined time locations that may be associated with one or more PDCCH monitoring occasions. In embodiments, a power saving signal may be DCI, a reference signal and/or a preamble. In embodiments, the power saving signal may be PHY signaling, RRC signaling, MAC or MAC CE. A value of k0min may be configured for each bandwidth part (BWP). In such embodiments, the applicable value may be that of the active BWP in which the PDCCH is decoded. Additional alternatives for the power saving signal are described below with respect to how a WTRU may determine a radio performance state.

In embodiments, a radio performance state may include at least one reference sensitivity level. Additionally or alternatively, a radio performance state may include a maximum TBS, rank, modulation order or coding rate for PDSCH decoding or PUSCH transmission and/or a set of possible PDSCH mapping types. Additionally or alternatively, a radio performance state may include a set or maximum number of BWPs or active BWPs that can be operated on. Additionally or alternatively, a radio performance state may include a maximum number or a set or subset of (per BWP, CC or WTRU) active TCI states for PDCCH, active TCI states for PDSCH, one port or two ports NZP-CSI-RS resources for beam management (e.g. CRI/RSRP, SSBRI/RSRP), NZP CSI-RS or SSB resources for CSI reporting, NZP CSI-RS or SSB resources for RRM measurements, periodic CSI reports, semi-persistent CSI reports or aperiodic CSI report settings, CSI reports that the WTRU can simultaneously process, TRS resource sets that the WTRU can simultaneously track, CSI-RS or SSB resources for PDCCH quality monitoring, CSI-RS/SSB resources for new beam identifications, and/or RSRP values for non-group based RSRP reporting.

In embodiments, a radio performance state may include a number, a maximum number or a set of CORESETs, PDCCH search spaces, PDCCH candidates, PDCCH aggregation levels, DCI formats, and/or monitored PDCCH occasions within a CORESET or pattern thereof for PDCCH monitoring (per BWP, CC or WTRU) and/or whether PDCCH repetition may be used for PDCCH monitoring. Additionally or alternatively, a radio performance state may include monitoring behavior, such as whether a certain RS or SSB is expected to be received only during active time (or while certain DRX timers are running) or whenever they are configured to be occurring. Additionally or alternatively, a radio performance state may include a level of WTRU processing and/or a DRX configuration, an aspect of a DRX configuration and/or a parameter configuration within a DRX configuration.

In embodiments, a radio performance state may include at least one of the following RRM requirements, such as defined in an evaluation period for radio link quality, a number of NR or inter-RAT frequency carriers that can be monitored, a number of reporting criteria that may be supported in parallel, a number of intra-frequency, inter-frequency or inter-RAT cells that may be monitored, a latency for identification of a new detectable intra-frequency, inter-frequency or inter-RAT cell, a measurement period, and/or an accuracy requirement for RRM measurements. Additionally or alternatively, a radio performance state may include a set of configured PDSCH-to-HARQ feedback timing indicators (k1) that may be indicated by DCI. A minimum value k1min of the PDSCH-to-HARQ feedback timing may be configured. In such embodiments, a WTRU may transmit HARQ feedback, for example, only if the indicated k1 value is equal to or higher than the minimum value k1min applicable to the current radio performance state. An offset k1off of the PDSCH-to-HARQ feedback timing may be configured. In such embodiments, the WTRU may apply a PDSCH-to-HARQ feedback timing corresponding to the sum of k1off applicable to the radio performance state, and of the indicated k1 value.

In embodiments, a radio performance state may include a set of configured time domain relations between PDCCH and PDSCH that may be indicated by DCI, including, for example, a number of slots (k0) between PDCCH and PDSCH (e.g., cross-slot scheduling offset), a PDSCH mapping type and a combination of start symbol and length of PDSCH. Additionally or alternatively, a radio performance state may include an offset k0off of the number of slots k0 between PDCCH and PDSCH (or PUSCH). The WTRU may determine that the number of slots between the PDCCH and PDSCH corresponds to the sum of the indicated k0 value and of the offset k0off applicable to the current radio performance state. The offset value k0off may depend or may be applicable only if the PDCCH is decoded in certain time symbols of the slot or of the CORESET. For example, the value may depend on whether PDCCH is decoded in the last 3 symbols of a slot or in the first 4 symbols. The value of k0off for the radio performance state may signaled by RRC or MAC CE. A value of k0off may be configured for each BWP. In this case, the applicable value may be that of the active bandwidth part in which the PDCCH is decoded.

In embodiments, a radio performance state may include a number of RF chains, active antenna chains, RF panels and/or diversity branches expected for reception. Additionally or alternatively, a radio performance state may include a number of antenna elements for MIMO and/or a MIMO algorithm.

WTRU power consumption may be improved from different implementation aspects when the WTRU operates in a radio performance state that includes reduced requirements or capabilities. For example, a WTRU may be able to switch off one or more RF chains if it knows that the required sensitivity level according to the current radio performance state is relaxed to a certain value. The WTRU may also be able to switch off certain antenna panels if the number of TCI states that are active is reduced.

Similarly, a WTRU may be able to switch off one or more RF chains and possibly some baseband components if it knows that the maximum transport block size or rank for PDSCH will be below a certain value at least up to a known point in the future. For this to be effective, the allowed latency before switching to a radio performance state corresponding to a higher performance should be higher than the latency required to turn on the necessary components in a practical implementation. Such minimum latency may be an aspect of a radio performance state (or of a transition between states) and may be configured or pre-defined.

A WTRU receiver may implement or use one or more receiver components (or configurations, types), and each receiver component may have its own capability (e.g., configuration). For example, a first receiver component may use a single RF chain, and a second receiver component may use multiple RF chains. In another example, a first receiver component may support QPSK as a maximum modulation order, and a second receiver component may support 256QAM as a maximum modulation order. The first receiver component may provide low peak throughput performance while consuming less power/energy, and the second receiver component may provide high peak throughput performance while consuming higher power/energy. The first receiver component may consume less power/energy than the second receiver component.

A WTRU may use one receiver component at a time, or a WTRU may use a set or subset of receiver components at a time. A receiver component or set of receiver components may be configured as a WTRU receiver with a certain capability. Hereafter, a receiver component, set of receiver components, subset of receiver components, receiver configuration, Rx configuration, Rx component, receiver type, Rx type, receiver capability, and Rx capability may be used interchangeably. An RF chain, transmit and receive unit (TXRU), RF transceiver, and RF may be interchangeably used.

In embodiments, a power or performance mode may determine one or more receiver components that a WTRU may use. Each receiver component may consume a separate or different level of power or energy. For example, a receiver component (or set of receiver components) that may consume a high power/energy may correspond to a high power mode. A receiver component (or set of receiver components) that may consume a low power/energy may correspond to a low power mode. Low power mode, power saving mode and power savings mode may be used interchangeably herein. High power mode, normal power mode and non-power saving mode may be used interchangeably herein. For another example, a receiver component or set of receiver components that may support a high peak throughput may correspond to a high performance mode. A receiver component or set of receiver components that may support a low peak throughput may correspond to a low performance mode.

In embodiments, a power or performance mode may be associated with one or more transmission and/or reception (Tx/Rx) parameters. A Tx/Rx parameter may be determined or known by a WTRU. A Tx/Rx parameter may be configured, such as via signaling from a gNB. A WTRU may signal or report a Tx/Rx parameter that the WTRU supports to a gNB. The WTRU may signal or report a Tx/Rx parameter that the WTRU supports for each receiver component, set of receiver components, power mode, and/or performance mode that the WTRU supports.

In embodiments, a Tx/Rx parameter may be a number of RF chains. A first power mode may use a first number of RF chains (e.g., 4), and a second power mode may use a second number of RF chains (e.g., 1) in a cell, carrier, or BWP. The number of RF chains used at a WTRU receiver may be referred to as the maximum rank supported for a PDSCH reception. For example, if the supported maximum rank is X (e.g., 1 or 4), at least X (e.g., 1 or 4) RF chains may be used or active, such as for reception in a carrier/BWP. A first power mode may support a maximum rank 4, and a second power mode may support a maximum rank 1.

The number of RF chains used at a WTRU receiver may be indicated, determined, or used based on the coverage level of the WTRU. A first coverage level may be associated with a first power mode, and a second coverage level may be associated with a second power mode. A coverage mode and a power mode may be interchangeably used.

A supported power mode may be indicated from or reported by a WTRU, such as WTRU capability. For example, if a WTRU supports multiple power modes (e.g., normal and low or high, medium, and low), the WTRU may report the supported power modes to a gNB. In another example the WTRU may report that it supports a low or power saving mode. The WTRU may report a capability (e.g., number of RF chains or maximum rank) associated with a power mode or coverage level. For example, the WTRU may report a capability it supports for each power mode and/or coverage level that it supports. If a WTRU supports multiple power modes, the WTRU may report the supported power modes and their associated capabilities to a gNB.

In embodiments, a Tx/Rx parameter may be a receiver sensitivity level, which may be different based on the power mode. A WTRU may report its receiver sensitivity level based on the power mode.

In embodiments, a Tx/Rx parameter may be a supported maximum modulation order (e.g., 256QAM), which may be determined, indicated, or reported for each power mode as a WTRU capability. A WTRU may indicate its capability of maximum modulation order supported for each power mode. A maximum modulation order and a maximum modulation coding scheme (MCS) level may be interchangeably used herein.

In embodiments, a Tx/Rx parameter may be a maximum supported RF bandwidth (e.g., 1 GHz). A maximum supportable bandwidth may be determined, indicated, or reported for each power mode as a WTRU capability. A maximum RF bandwidth may be indicated as the maximum number of RBs supported for a PDSCH. Additionally or alternatively, a Tx/Rx parameter may be at least one of a maximum number of carriers supported (e.g., simultaneously with carrier aggregations), a maximum BWP size within a carrier (e.g., up to 275 RBs), and/or a maximum number of BWPs supported for simultaneous reception. Additionally or alternatively, a Tx/Rx parameter may be a maximum number of beams (or beam group) supported. A number of beams supported may be different based on the power mode. The number of beams may be the number of Rx beams (or indicated as the number of SRS resources required for a beam management at a WTRU).

In embodiments, a Tx/Rx parameter may be a maximum coupling loss supported (e.g., coverage level). Additionally or alternatively, a Tx/Rx parameter may be a set of subcarrier spacings supported in a given frequency band (e.g., 15 kHz, 30 kHz, 60 kHz, 120 kHz). Additionally or alternatively, a Tx/Rx parameter may be at least one of a minimum HARQ-ACK timing supported for a set of scheduling parameters and/or conditions and a minimum timeline supported for a set of aperiodic CSI reporting configurations when it is triggered. Additionally or alternatively, a Tx/Rx parameter may be at least one of a channel estimation scheme, a precoding granularity for channel estimation of DM-RS, a channel coding scheme (e.g., Turbo, LDPC, Polar, Convolutional, RM), and/or a MIMO receiver type (e.g., MMSE, ML). Additionally or alternatively, a Tx/Rx parameter may be a sleep mode (e.g., no sleep, deep sleep, partial sleep, light sleep). A wake-up time may be determined based on the sleep mode. The wake-up time may be a time (e.g., a time required) to start receiving a downlink signal (e.g., PDCCH). A wake-up time, warm-up time, preparation time, and activation time may be interchangeably used.

Figure 6:
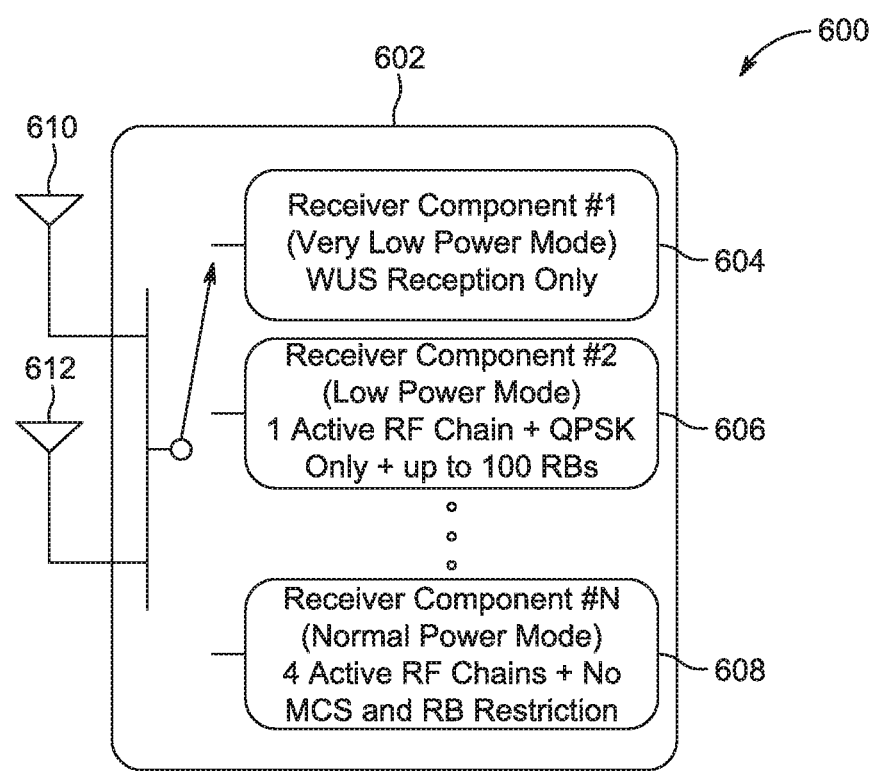
FIG. 6 is a diagram of an example WTRU configured with multiple receiver components that may correspond to different power modes.

FIG. 6 is a diagram of an example WTRU 600 configured with multiple receiver components that may correspond to different power modes. In the example illustrated in FIG. 6, the WTRU 600 includes two antennas 610 and 612, which may be communicatively coupled to receiver components 604, 606 and 608. While FIG. 6 shows two antennas and three receiver components, one of ordinary skill in the art will recognize that the embodiments described herein may be applicable to WTRUs having any number of antennas and receiver components.

In the example illustrated in FIG. 6, one of the receiver components 604, 606 and 608 may be used at a time based on the target power mode. A first receiver component 604 may be used for a WUS reception only and may consume a first (e.g., very low) amount of power. This may be because, for example it may only detect a sequence with a correlator. A second receiver component 606 may be used for downlink signal reception, for example with a scheduling restriction (e.g., QPSK modulation only, up to rank-1, and up to 100 PRBs). The second receiver component 606 may consume a second amount of power (e.g., low power/energy). A third or Nth receiver component 608 may be used for a downlink signal, for example without a scheduling restriction. The third or Nth receiver component 608 may consume a third or Nth power/energy (e.g., a highest power/energy among the receiver components).

The number of receiver components may be based on WTRU capability. A WTRU may report the number of receiver components supported as a WTRU capability. One or more sets of receiver components may be supported, and a WTRU may indicate which set it supports. An example of sets may include: a first set (Set-1), which may include a single receiver component and may, for example, support a normal power mode only; a second set (Set-2), which may include two receiver components, which may, for example, support WUS reception only or WUS reception and normal power mode; a third set (Set-), which may include two receiver components, which may, for example, support lower power mode and normal power mode; and a set 4 (Set-4), which may include three receiver components, which may, for example, support all power modes.

A WTRU may report a required switching time between receiver components (e.g., a time needed by the WTRU to switch from one receiver component or set of receiver components to another receiver component or set of receiver components). The switching time may depend on the current power mode and target power mode. For example, the switching time may be shorter if the current power mode is a higher power mode than the target power mode. Otherwise, the switching time may be longer.

A receiver component or set of receiver components may have a coverage level. Two or more receiver components or sets of receiver components may have different coverage levels. A receiver component or set of receiver components that may be used for a power mode without scheduling restriction may support the best coverage. A receiver component or set of receiver components that may be used for only WUS reception may support a similar coverage level as the normal power mode. A receiver component or set of receiver components that may be used for a power mode with scheduling restriction may support a low or worst coverage, such as lower coverage than the receiver component or set of receiver components for normal power mode without scheduling restriction and/or for WUS reception such as WUS reception only.

In embodiments, a WTRU may use one or more receiver components. The WTRU may determine a receiver component or set of receiver components to use for a downlink signal reception. Which receiver component or set of receiver components to use for a downlink signal reception may be indicated (e.g., directly or indirectly) to the WTRU. Further, a set of scheduling restriction parameters (SRPs) may be configured or provided, such as by a gNB. A WTRU may determine which receiver component or set of receiver components to use based on the configured or provided SRPs. A scheduling restriction parameter (SRP) may include one or more of a maximum rank (e.g., for PDSCH and/or PUSCH), a maximum modulation order (e.g., QPSK, 16QAM, 256QAM), a maximum TBS, a candidate transmission scheme (e.g., single TRP or multi-point TRP), a lowest or minimum coding rate, a maximum number of RBs, a minimum and/or maximum HARQ timeline, and/or a maximum timing advance (TA) value.

One or more search spaces or CORESETs may be configured, and each search space may be associated with a set of SRPs. For example, each search space ID (SearchSpaceID) may be associated with a set of SRPs. A WTRU may determine which receiver component, set of receiver components, or power mode to use based on the search space the WTRU monitors. The DCI fields in the DCI monitored for a search space may be determined based on the associated set of SRPs. One or more search spaces with different sets of SRPs may not be monitored at the same time (e.g., in a same slot or a same time window). A WTRU may monitor a subset of search spaces with a lower or higher power mode and skip monitoring the rest of search spaces if one or more search spaces overlap in a same time window. If one or more search spaces with different sets of SRPs overlap in a time window (e.g., in same slot), a WTRU may use a receiver component that can receive all search spaces in the time window. The terms search space and CORESET may be used interchangeably herein. One or more PDCCH candidates may be used, and each PDCCH candidate may be associated with a set of SRPs. A WTRU may determine a receiver component, a set of receiver components, or a power mode based on the PDCCH candidate in which the WTRU receives a DCI.

A WTRU may determine which receiver component, set of components, or power mode to use based on WTRU RRC connection status (e.g., RRC connected, RRC idle, and RRC inactive). A first receiver component, set of receiver components or power mode (e.g., low power mode) may be used when a WTRU is in RRC idle or RRC inactive. A second receiver component, set of receiver components, or power mode (e.g., high power mode) may be used when a WTRU is in RRC connected. A WTRU may use a first receiver component, set of receiver components or power mode for RRC idle and RRC inactive. The WTRU may use either a first or second receiver component, set of receiver components, or power mode in RRC connected based on a determined set of SRPs.

A WTRU may determine which receiver component, set of components, or power mode to use based on a downlink channel type (e.g., PDCCH, PDSCH, SS/PBCH block). Additionally or alternatively, a WTRU may determine which receiver component, set of components, or power mode to use (e.g., in a BWP) based on a bandwidth part identity (e.g., BWP-id of an active BWP).

A set of SRPs may be configured for each BWP, and a WTRU may determine a receiver component, set of components, or a power mode based on the associated set of SRPs in the active BWP. A first BWP may be associated with a subset of modulation orders (e.g., up to QPSK), and a second BWP may be associated with a second subset or a full set of modulation orders (e.g., up to 64QAM or 256QAM). Based on the set of modulation orders associated with the BWP, a WTRU may determine the receiver component, set of receiver components or the power mode, for example to use when operating (e.g., receiving) in the BWP. The associated set of modulation orders (or a maximum modulation order) may be configured in each BWP configuration.

A CQI table for a CSI reporting may be determined based on the BWP (or BWP-id of an active BWP) and/or the associated set of modulation orders (or a maximum modulation order). The number of entries for MCS indication for a PDSCH scheduling may be determined based on the BWP (or BWP-id of an active BWP) and/or the associated set of modulation orders (or a maximum modulation order). The number of MCS bits in a DCI for a PDSCH scheduling may be determined based on the BWP-ID of the active BWP. The maximum modulation order may be limited for only downlink or uplink.

A first BWP switching time or gap may be used when the active BWP is switched between BWPs with the same set of SRPs, and a second BWP switching time (or gap) may be used when the active BWP is switched between BWPs with a different set of SRPs. A longer switching time (or gap) may be required or used when a receiver component, set of receiver components, or power mode is different between BWPs.

A WTRU may determine which receiver component, set of components, or power mode to use based on one or more of a carrier index (e.g., serving cell ID), a frequency range (e.g., frequency range 1 or frequency range 2), a traffic type (e.g., eMBB, mMTC, or URLLC), and/or a QoS type (e.g., latency level, reliability level, required throughput level).

A WTRU may determine which receiver component, set of components, or power mode to use based on a coverage level. A receiver component, set of receiver components, or power mode may be determined based on the PDCCH aggregation level in which a WTRU received a DCI. A receiver component, set of receiver components, or power mode may be determined based on one or more downlink measurements (e.g., CQI, SINR, L1-RSRP, RSRP, or RSRQ). A WTRU may monitor a DCI which may be associated with the determined receiver component, set of receiver components, or power mode.

Figure 7:
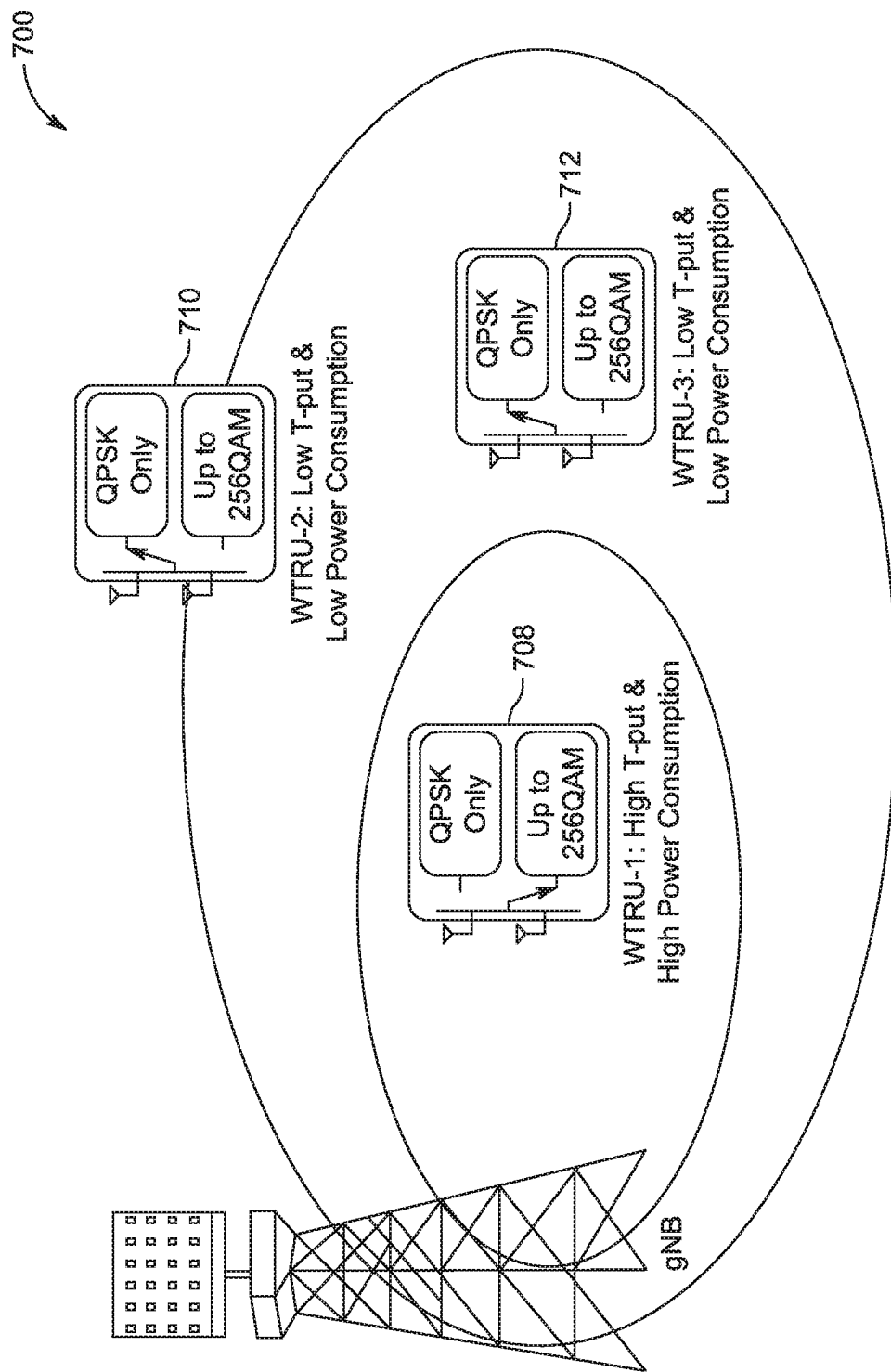
FIG. 7 is a system diagram showing an example usage of a low power mode receiver in different coverage scenarios.

FIG. 7 is a system diagram 700 showing an example usage of a low power mode receiver in different coverage scenarios. When a WTRU is at cell-edge, such as WTRUs 710 and 712, the WTRU may not be able to receive a modulation order higher than QPSK, for example due to poor channel conditions. If a WTRU uses, or a gNB allows a WTRU to use, a receiver component that supports up to QPSK modulation order only, the WTRU may be able to save battery. The receiver component may consume less power during PDCCH and PDSCH receptions as compared with a receiver component supporting a higher modulation order. The WTRU 708, which is not at cell edge, may operate in a different, higher power mode that supports up to 256 QAM.

A WTRU may receive a configuration or indication, such as from a gNB, to use a receiver component, a set of receiver components or a power mode that may support a limited maximum modulation order and/or one or more other scheduling restrictions. Alternatively, the WTRU may receive a configuration or indication of a maximum modulation order that may be scheduled or used and/or one or more other scheduling restrictions. The WTRU may assume that a modulation order to be scheduled for a downlink channel, such as PDCCH or PDSCH, may not be higher than the limited maximum modulation order (e.g., QPSK). A maximum transmission rank may be determined based on the maximum modulation order used for the determined receiver component. A maximum transmission bandwidth may be determined based on the maximum modulation used for the determined receiver component.

A gNB may switch from a low power mode (e.g., up to QPSK) to a high power mode or vice versa with a dynamic indication (e.g., implicit by search space activation or explicit by DCI indication) with a switching time. A switching time, such as receiver component switching time, may be provided and/or used when a maximum modulation order for a downlink scheduling is increased or decreased. The switching time may be the same as the switching time for BWP switching. A WTRU may skip monitoring PDCCH during the switching time.

In some embodiments, some radio performance aspects, such as described above, may be configured and/or activated independently. For example, a first type of radio performance state may be defined for RF aspects including, for example, a reference sensitivity level and a number of RF chains, a second type of radio performance state may be configured for baseband aspects including, for example, a maximum transport block size, and a third type of radio performance state may be defined for RRM aspects. In another example, a first type of radio performance state may be defined for PDCCH decoding aspects, and a second type of radio performance state may be defined for PDSCH decoding aspects.

In embodiments, a radio performance state may be configured (e.g. by RRC) by configuring a set of values for at least one applicable aspect. For example, the RRC configuration may include a list of radio performance states, each including a maximum transport block size, maximum rank, receiver sensitivity values and other information elements for applicable aspects. Further, an identity parameter may be configured for each radio performance state. The identity parameters may be assigned such that, for example, a higher value may correspond to higher requirements.

In embodiments, a default radio performance state may be defined. Such radio performance state may correspond to the set of capabilities of the WTRU provided to higher layers (e.g., maximum performance or capability). Such default radio performance may not require additional configuration by RRC. Alternatively, a default radio performance state may correspond to a power-efficient state.

A set of applicable radio performance states may be added to the configuration of an applicable aspect. For example, the configuration of a TCI state may include at least one additional information element indicating one or more radio performance states for which this TCI state may be active. This indication could be provided an information element that indicates the maximum identity parameter of applicable radio performance states. In case only two radio performance states are defined, the information element may be a Boolean value indicating whether the TCI state can be activated in the radio performance state corresponding to a power-efficient state.

Additional information elements may be defined for the configuration of certain aspects when in a specific radio performance state. For example, an information element configuring the CSI report configuration when in the non-default (power-efficient) radio performance state may be used. This may be particularly useful when a large number of parameters are affected and only 2 performance states (e.g. a default one and a power-efficient one) are defined.

A WTRU may determine the applicable radio performance state based on at least one of a number of different methods. In some embodiments, the radio performance state may be indicated explicitly by physical layer, MAC or RRC signaling. For example, the WTRU may receive a MAC control element indicating a radio performance state or the value for an applicable aspect. The WTRU may activate the necessary components such that it is prepared to operate using the indicated state no later than a pre-defined number of slots or symbols (or ms) following transmission of HARQ acknowledging reception of the corresponding transport block.

For example, in some embodiments, a minimum cross-slot scheduling delay (minimum k0 or minimum k2) may be indicated by a DCI field, such as a time domain resource allocation (TDRA) field. For example, a minimum k0 or k2 value may be configured for each codepoint of this field, in addition to existing parameters, such as k0, mapping type, starting symbol and length. In case the value of minimum k0 (or k2) indicated by the field is different than the one currently used by the WTRU, the WTRU may modify the minimum k0 (or k2) value accordingly. In addition, the WTRU may determine that no PDSCH (or PUSCH) is received or transmitted. This may be applicable only if the indicated minimum value of k0 (or k2) is lower than the current value. The WTRU may determine that the change of minimum k0 (or k2) is valid on a condition that at least one other field of the DCI is set to a pre-defined value, to improve robustness. For example, a frequency-domain resource assignment field may have to be set to a pre-defined value. The WTRU may acknowledge reception of the signaling by transmitting HARQ-ACK for the corresponding DCI, for example over a resource indicated by a PUCCH resource indicator.

In some embodiments, the radio performance state may implicitly be switched or activated when the WTRU receives an activation command for an associated aspect. For example, a TCI state may be configured to be applicable to a non-default radio performance state, such as one corresponding to a higher reference sensitivity or a lower number of RF chains. Upon reception of a MAC CE indicating activation of this TCI state for PDCCH reception, the WTRU may operate according to the corresponding non-default radio performance state.

In some embodiments, a radio performance state may be determined based on at least one WTRU measurement, such as RRM measurement, or CSI measurement, such as L1-RSRP. For example, a WTRU may activate a default radio performance state if the RSRP of its serving cell is lower than a threshold. Such threshold may be signaled by MAC or RRC. Conversely, the WTRU may activate a non-default radio performance state if the RSRP of its serving cell is higher than a threshold. The WTRU may signal such switching of the radio performance state using MAC or RRC signaling.

In some embodiments, a WTRU may switch to a radio performance state, such as a radio performance state allowing for maximum performance, after decoding a PDCCH containing a DL assignment or UL grant for this WTRU. Additionally or alternatively, in some embodiments, a WTRU may be configured with a radio performance state timer of a certain duration. The WTRU may start or restart the radio performance timer when decoding a PDCCH containing a DL assignment or UL grant for this WTRU. Upon expiry of the timer, the WTRU may switch to a power-efficient radio performance state.

In some embodiments, a radio performance state may be determined based on whether at least one DRX timer is running or based on reception of a DRX MAC CE. For example, a WTRU may switch to a default radio performance state when an inactivity timer starts and switch to a non-default radio performance state when an inactivity timer, a UL or DL retransmission timer, and a UL and DL HARQ RTT timer have expired. In another example, a WTRU may switch to a non-default radio performance state after reception of a DRX command MAC CE or of a long DRX command MAC CE.

In some embodiments, a radio performance state may be configured to be associated with a BWP. Upon switching to a new BWP, the WTRU may also switch to the associated radio performance state. For example, a power-efficient radio performance state may be configured to be associated with a bandwidth part with a relatively narrow bandwidth, and a radio performance state allowing for maximum performance may be configured to be associated with a bandwidth part with a relatively wide bandwidth.

In some embodiments, a radio performance state may be associated with a configured grant or assignment. The WTRU may switch to this radio performance state upon transmission or reception of the configured grant or assignment.

Figure 8:
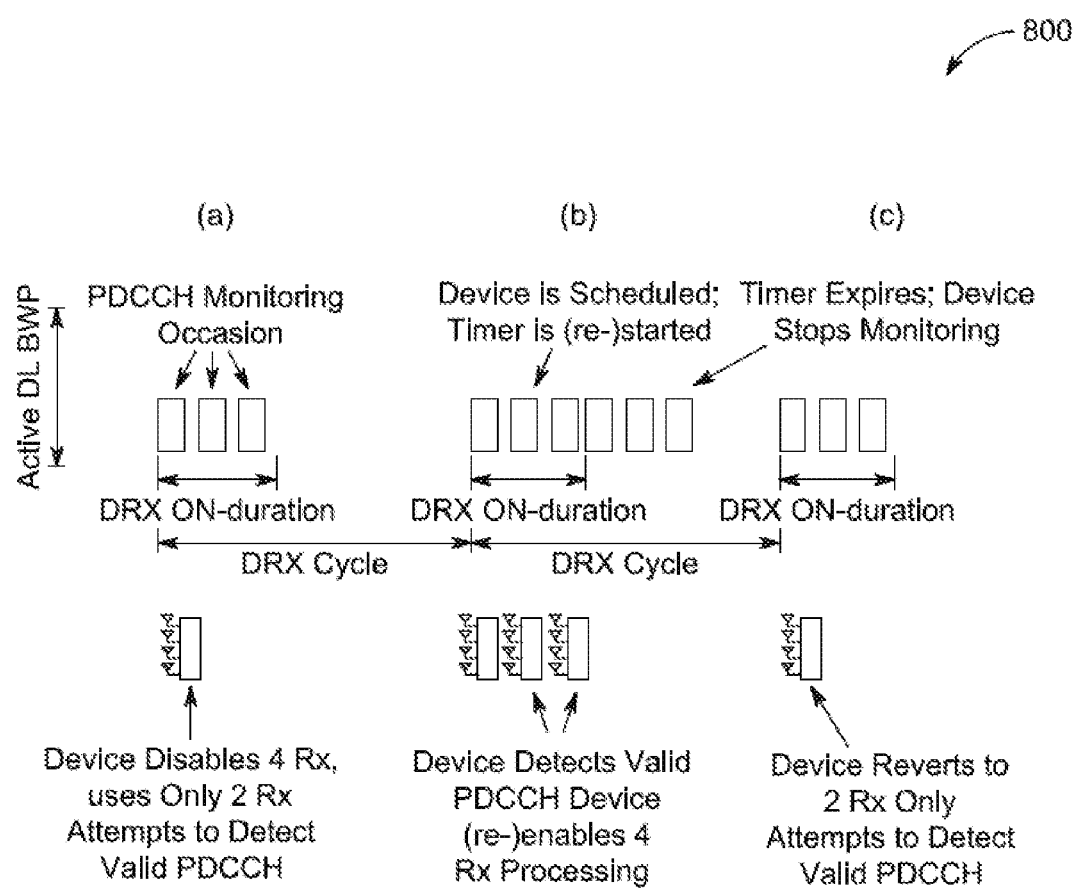
FIG. 8 is a diagram of an example of switching between two radio performance states.

FIG. 8 is a diagram 800 of an example of switching between two radio performance states. In the example illustrated in FIG. 8, a WTRU may switch between two radio performance states, a first radio performance state requiring the use of four Rx chains and a second radio performance state requiring the use of only two Rx chains. In the example illustrated in FIG. 8, a WTRU may be triggered to switch to the first radio performance state by WTRU scheduling (e.g., reception of DL assignment or UL grant). The WTRU may be triggered to switch to the second radio performance state by expiration of a timer. For example, in (a), the WTRU may disable 4 Rx, use only 2Rx and attempt to detect a valid PDCCH. In (b), the WTRU may be scheduled, may start a timer, and may enable or re-enable 4 Rx processing. When the timer expires, the WTRU may stop monitoring. In (c), the WTRU reverts to 2 Rx and attempts to detect a valid PDCCH.

In some embodiments, a radio performance state may be determined (e.g., implicitly) based on scheduling information or a property of the decoded PDCCH. This approach may have the benefit of avoiding the need for additional DCI formats to switch between states. For example, the scheduling information may include timing information, such as the number of slots (e.g., k0 or k2) between PDCCH and PDSCH (or PUSCH) or a duration of PDSCH or PUSCH. For example, the WTRU in a first state may switch to a second state if the indicated number of slots k0 is lower than a first configured threshold or corresponds to a configured value or codepoint. Such first threshold may correspond to a minimum number slots k0min configured for the first state. The WTRU in a second state may switch to a first state if the indicated number of slots k0 is higher than a second configured threshold or if the indicated number of slots k0 corresponds to a certain value or codepoint.

As part of the performance state behavior, for example, a WTRU that has been provided with a k0min (or k2min) and that receives a data scheduling DCI containing or indicating a k0<k0min (or a k2<k2min) may set the new value of k0min (or k2min) to the received k0 (or k2), or it may set the value of k0min (or k2min) to a default value such as zero slots.

There may be a time gap between when the scheduling DCI, implicitly indicating a new value for k0min (k2min), is received and when this information is available to the WTRU. This delay may be due to various receive operations, such as decoding and demodulation. In embodiments, a WTRU may not be buffering any potential PDSCH during the time gap following the PDCCH, and the data in the PDSCH may be lost. In some embodiments, instead of feeding back a NACK for the lost data, the WTRU may be expected not to send any acknowledgment feedback even if a PUCCH resource is provided in the DCI. In other embodiments, the DCI may indicate a non-transmission of ACK/NACK, such as by setting the PUCCH resource field (or another predetermined field) to a known value. These methods may in general be applicable when a WTRU performance state is implicitly switched to another performance state, and a temporary loss of data occurs during the switch.

The scheduling information may also or alternatively include timing information, such as the number of slots (denoted as X) between a grant (DL or UL grant) triggering an aperiodic reference signal (e.g., CSI-RS or SRS) and the reception and/or transmission of the aperiodic reference signal. For example, a WTRU in a first state may switch to a second state if the indicated number of slots is lower than a first configured threshold or corresponds to a configured value or codepoint. A WTRU in a second state may switch to a first state if the indicated number of slots is higher than a second configured threshold or corresponds to a configured value or codepoint. As part of the performance state behavior, a WTRU that has been provided with an Xmin and that receives a data scheduling DCI containing X<Xmin may set the new value of Xmin to the received X. Alternatively, it may set the value of Xmin to a default value such as zero slots. This may apply similarly to other possible parameters, such as SRS triggering offset.

The scheduling information may also or alternatively include frequency allocation, such as the number of RBs, a set of RBs, or a bandwidth part. For example, a WTRU in a first state may switch to a second state if the indicated number of RBs is higher than a configured threshold or if the indicated set of RBs includes RBs outside of a configured subset of RBs for the first state. Additionally or alternatively, the scheduling information may include information regarding whether the resources of the PDSCH or PUSCH in time or frequency overlap with the resources of a configured assignment or grant or the resources indicated by another grant or assignment. Additionally or alternatively, the scheduling information may include a BWP indication. For example, a WTRU may switch to a radio performance state configured for the indicated bandwidth part if different from the active bandwidth part.

In embodiments, the scheduling information may additionally or alternatively include an MCS or MCS table. For example, the WTRU in a first state may switch to a second state if the indicated MCS is above a configured MCS threshold or if the indicated MCS table is not part of a set of possible MCS tables configured for the first state. Additionally or alternatively, the scheduling information may include a number of layers (rank). For example, the WTRU in a first state may switch to a second state if the indicated number of layers is above a configured threshold. Additionally or alternatively, the scheduling information may include a TBS. For example, a WTRU in a first state may switch to a second if the transport block size determined from the DCI is above a configured threshold.

In embodiments, the scheduling information may additionally or alternatively include PDSCH-to-HARQ feedback timing. For example, a WTRU in a first state may switch to a second state if the indicated PDSCH-to-HARQ feedback latency is lower than a threshold. Such threshold may correspond to a minimum value of k1 configured for the first state. Additionally or alternatively, the scheduling information may include a transmission configuration indication (TCI). For example, the WTRU in a first state may switch to a second state if the indicated TCI is not part of a set of possible TCIs configured for the first state. Additionally or alternatively, the scheduling information may include information regarding scheduling on supplementary uplink (SUL) or normal UL (NUL). For example, a WTRU in a first state may switch to a second state if PUSCH is scheduled on SUL. For example, the second state may correspond to a radio performance state with a lower reference sensitivity level or larger number of antennas.

In embodiments, the scheduling information may additionally or alternatively include an indication of a transmission profile that may indicate a priority associated with a transmission, such as for prioritizing between eMBB and URLLC services. For example, a WTRU in a first state may switch to a second state if an indicated transmission profile is not part of a set of possible transmission profiles configured for the first state. Additionally or alternatively, the scheduling information may include information regarding a logical channel for which data is included in a transport block. For example, a WTRU in a first state may switch to a second state if the transport block includes data from a logical channel that is not part of a set of possible logical channels configured for the first state. Such configuration may be implicit from logical channel prioritization (LCP) restrictions configured for the logical channel. For example, the configuration may implicitly include any logical channel subject to a maximum PUSCH duration restriction where the duration may be lower than a threshold or a logical channel subject to a cell restriction, or a logical channel mapped to a bearer for which duplication is configured or activated.

In some embodiments, the scheduling information may additionally or alternatively include a PDSCH mapping type. For example, a WTRU in a first state may switch to a second state if the indicated PDSCH mapping type is not part of a subset of mapping types configured for the first state. Additionally or alternatively, the scheduling information may include a radio network temporary identifier (RNTI) used to decode PDCCH. For example, the WTRU in a first state may switch to a second state if the indicated RNTI is not part of a subset of RNTIs configured for the first state.

In embodiments, a PDCCH-based WUS may be transmitted to a WTRU before the DRX ON duration to wake the WTRU up so that it can start monitoring the PDCCH during the ON duration. The search spaces, CORESETs, and monitoring periodicities to monitor during the ON duration may be indicated by the RNTI of the WUS. For example, for a first RNTI, a WTRU may monitor a first set of search spaces, and for a second RNTI, the WTRU may monitor a second set of search spaces. The association between an RNTI and associated search spaces may be configured by the gNB.

In other embodiments, CRC bits that are not scrambled with an RNTI may be scrambled with an R-ID, and the R-ID may be associated with, for example, a set of search spaces, CORESETs or monitoring periodicities to monitor during the ON duration. For example, when a WTRU detects a first R-ID, it may be expected to monitor the associated search spaces. The association between an R-ID and associated search spaces may be configured by the gNB. In other embodiments, the R-ID may be the exact ID of the search space to be monitored during the ON duration, or it may be derived from the associated search space with a known relationship.

In embodiments, the scheduling information may additionally or alternatively include a DCI format. For example, a WTRU in a first state may switch to a second state upon reception of a pre-emption indication (Format 2_1) or of a TPC command (Format 2_2). Additionally or alternatively, the scheduling information may include a property of the decoded PDCCH, such as a CORESET, a search space, or timing. For example, a WTRU in a first state may switch to a second state upon reception of a DCI in a certain configured search space or depending on whether the search space is a common or dedicated search space. Additionally or alternatively, the scheduling information may be based on successful decoding of PDCCH whereby the PDCCH schedules a specific type of transmission. For example, a WTRU may monitor and detect the PDCCH in a first power state and may switch to a second power state if it is scheduled for a semi-persistent data transmission. For example, the WTRU may use a lower number of RF chains to monitor the PDCCH, and, when it receives and decodes a scheduling PDCCH, it may switch to a higher number of RF chains if it is scheduled with semi-persistent data. In embodiments, the scheduling information may additionally or alternatively include a number of assignments, grants and/or DCIs received within a time period. For example, a WTRU in a first state may switch to a second state if such number exceed a configured threshold within a configured time period applicable to the second state.

Similar to the example illustrated in FIG. 8, for any of the above possible triggers based on scheduling, a timer may be started or restarted when a condition that would lead to determining to use the second state is met. Upon timer expiry, the WTRU may switch back to the first state.

Figure 9:
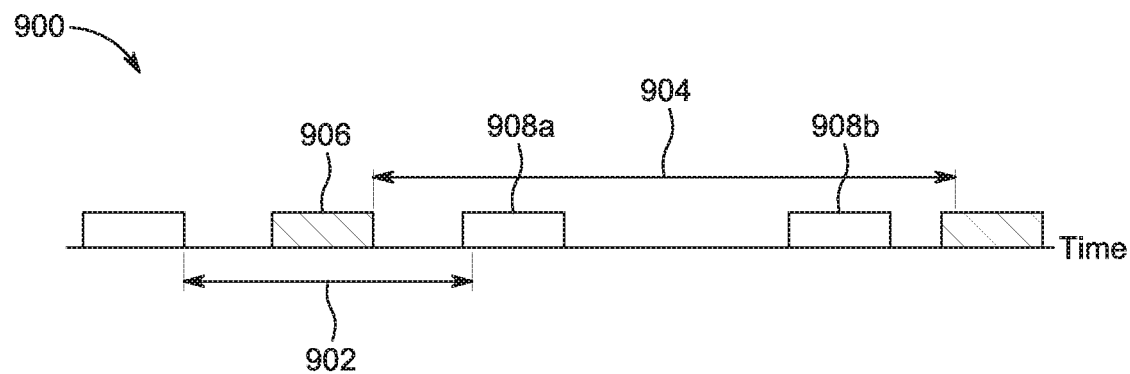
FIG. 9 is a signal diagram of an example of multiple DRX configurations based on power mode.
Figure 11:
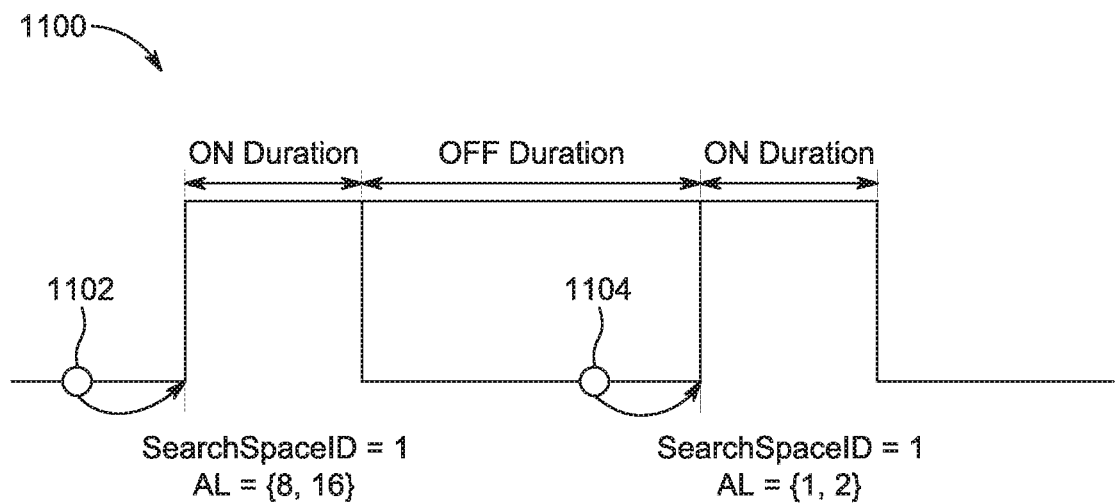
FIG. 11 is a signal diagram of an example of a wake up signal (WUS) determining a power mode of associated PDCCH monitoring occasions and a set of aggregation levels for the physical downlink control channel (PDCCH) monitoring.

As an alternative to the embodiment illustrated in FIG. 8, in some embodiments, one or more DRX cycles and/or configurations may be configured and used by a WTRU. Each DRX cycle or configuration may be associated with a power mode. As mentioned above, a power mode may be predetermined, configured, defined, and/or used by a gNB and/or WTRU. A power mode may have one or more attributes, such as power, energy budget and/or transmit RF chains to use, activate or deactivate. In some embodiments, a power mode may be activated or deactivated based on information provided by a WTRU, which may include, for example, a coverage level, channel state information, battery level and/or WTRU capability (e.g., to support a number of RF chains or turn on/off one or more RF chains). FIGS. 9, 10 and 11 and the corresponding description provide examples of different methods of using DRX cycles to implement various power modes.

FIG. 9 is a signal diagram 900 of an example of multiple DRX configurations based on power mode. In the example illustrated in FIG. 9, two DRX cycles 902 and 904 are configured. The second DRX cycle 904 may be longer than the first DRX cycle 902. The first DRX cycle 902 may be associated with a lower power or power savings mode, and the second DRX cycle 904 may be associated with a high power or normal power mode. During the ON duration 906 of the first DRX cycle, the WTRU may operate in the lower power mode. For example, the WTRU may turn on only part of its circuitry (e.g., a subset of the RF chains), or it may turn off or not use at least some of its circuitry. During the ON duration 908a, 908b, the WTRU may operate in a normal power mode. For example, it may turn on and/or use all of its RF chains or a larger subset of the RF chains than for the first DRX cycle 902. As shown in FIG. 9, since the second DRX cycle 904 is longer than the first DRX cycle 902, the second DRX cycle 904 may include more than one ON duration 908a, 908b.

When one or more DRX configurations are used, at least one DRX parameter may be different for each DRX configuration. Use of a DRX cycle may correspond to monitoring or not monitoring the PDCCH based on a DRX cycle. For example, use of a DRX cycle may correspond to monitoring or not monitoring the PDCCH based on at least one parameter, time, duration, timer, or aspect of a DRX cycle or configuration such as an ON duration, an ON duration timer, an active time, and OFF duration, an OFF duration timer, and a retransmission.

A WTRU may use one DRX configuration (or DRX cycle) at a time. Alternatively, a WTRU may use one or more DRX configurations (or DRX cycles) at the same time. Each DRX configuration may be associated with a power mode. For example, high power mode may be associated with a first Rx configuration (e.g., a larger # of RF chains or a larger # of activated or used RF chains), and a low or lower power mode may be associated with a second Rx configuration (e.g., a smaller # of RF chains or a smaller # of activated or used RF chains).

A PDCCH transmitted by a gNB and/or received by a WTRU may be associated with a power mode or may carry associated power mode information. The power mode information may indicate the power mode.

A PDCCH that may be associated with a power mode may be monitored or received during an ON duration of a corresponding DRX cycle that may be associated with the power mode.

One or more parameters or aspects of a PDDCH channel or of PDCCH monitoring may be based on the power mode in use when the PDCCH is monitored. A WTRU may determine and/or use a parameter or aspect of a PDCCH channel or of PDCCH monitoring based on the power mode being used by the WTRU when the WTRU monitors the PDCCH. A parameter or aspect may be at least one of an aggregation level, a set of aggregation levels, and/or a REG-bundle size.

For example, one or more higher levels of aggregation may be needed and/or used for monitoring the PDCCH for a low power or power saving mode, for example due to coverage loss when fewer RF chains are used. In another example, a larger REG-bundle size may be needed and/or used for monitoring the PDCCH for a low power or power saving mode.

In embodiments, a first set of aggregation levels may be used to monitor a PDCCH in an ON duration or active time associated with a first DRX cycle. A second set of aggregation levels may be used to monitor a PDCCH in an ON duration or active time associated with a second DRX cycle. In an example, the first set of aggregation levels may include smaller aggregation levels, and the second set of aggregation levels may include larger aggregation levels. In another example, the second set of aggregation levels may include at least one aggregation level that is larger than the aggregation levels (e.g., all the aggregation levels) in the first set of aggregation levels. In embodiments, a first REG-bundle size may be used to monitor a PDCCH in ON durations associated with a high power mode, and a second REG-bundle size may be used to monitor a PDCCH in ON durations associated with a low power mode.

When a WTRU receives a PDCCH while in an ON duration or active time, the WTRU may operate in a power mode, for example to receive data in a PDSCH that may be scheduled or granted by the PDCCH. For example, if a PDCCH is detected during an ON duration or active time of a certain DRX cycle, then the WTRU may stay in the certain power mode while receiving an associated PDSCH and/or user data. After a PDCCH is detected during an ON duration or active time, the WTRU may start a timer and may monitor or continue monitoring the PDCCH, for example until the timer expires. During this monitoring, the power mode associated with the detected PDCCH, the ON duration, or the active time may be used.

One or more parameters or aspects of a PDSCH channel or a PDSCH transmission or reception may be based on a power mode, for example when the associated PDCCH is monitored. A WTRU may determine and/or use a parameter or aspect of a PDSCH channel or of a PDSCH transmission or reception based on the power mode being used by the WTRU, for example when the WTRU monitors the associated PDCCH. A parameter or aspect may be at least one of a rank, a maximum rank, a DM-RS parameter such as a DM-RS density, an MCS level, and/or a maximum MCS level.

A maximum rank for a PDSCH reception may be determined or limited by the power mode associated with the PDSCH or associated with the PDCCH that scheduled the PDSCH. The power mode associated with the PDCCH may be the power mode associated with the DRX cycle, the ON duration and/or the active time during which the PDCCH was detected. A rank may be interchangeably used with a number of layers, a number of data streams, a number of a spatial layers, and a number of data symbols simultaneously transmitted at the same time/frequency. A first maximum rank (e.g., 4) may be used when a WTRU monitors a PDCCH or receives a DCI in an ON duration or active time associated with a first power mode, and a second maximum rank (e.g., 1) may be used when a WTRU monitors a PDCCH in an ON duration or active time associated with a second power mode. The nth maximum rank may be used for reception of a PDSCH scheduled by the PDCCH in the ON duration or active time associated with the nth power mode. A lower maximum rank may be used for a lower power mode. For example a lower maximum rank may be used for a power savings mode than a normal mode.

A DM-RS density for a PDSCH reception may be determined based on the power mode associated with the PDSCH. A first DM-RS density of or for a PDSCH may be used when a WTRU monitors one or more PDCCHs or receives a DCI for the PDSCH in a DRX cycle, an ON duration or an active time associated with a first power mode. A second DM-RS density of or for a PDSCH may be used when a WTRU monitors one or more PDCCHs or receives a DCI for the PDSCH in a DRX cycle, an ON duration, or an active time associated with a second power mode. A DM-RS density of or for a PDSCH may be based on or correspond to a number of DM-RS symbols used within a slot. For example, a first DM-RS density may use a first number of DM-RS symbols (e.g., 4 DM-RS symbols) in a slot for a PDSCH, and a second DM-RS density may use a second number of DM-RS symbols (e.g., 2 DM-RS symbols) in a slot for a PDSCH.

A maximum MCS level may be determined based on the power mode associated with the PDSCH. A first maximum MCS level (e.g., 256QAM) may be used when a WTRU monitors one or more PDCCHs or receives a DCI for the PDSCH in a DRX cycle, an ON duration, or an active time associated with a first power mode. A second maximum MCS level (e.g., QPSK) may be used when a WTRU monitors one or more PDCCHs or receives a DCI for the PDSCH in a DRX cycle, an ON duration, or an active time associated with a second power mode.

A low power mode may be a power savings mode. A high power mode may be a normal or non-power saving mode. active time may be substituted for ON duration in the embodiments and examples described herein and still be consistent with this disclosure. An ON duration or an active time may be associated with a DRX cycle and/or a power mode.

Herein, ON duration or active time may be replaced by a duration for PDCCH monitoring, a PDCCH monitoring occasion, and/or a search space. ON duration or active time may include one or more PDCCH monitoring occasions. ON duration and/or active time may include one or more search spaces, for example for monitoring the PDCCH. A WTRU may monitor a PDCCH at or during a PDCCH monitoring occasion. PDCCH occasion and PDCCH monitoring occasion may be used interchangeably herein.

FIG. 10 is a signal diagram 1000 of an example of power mode switching between ON durations in different DRX cycles. In the example illustrated in FIG. 10, a WTRU may monitor the PDCCH in an ON duration 1002a of a DRX cycle or in a PDCCH monitoring occasion using an associated power mode. When a PDCCH is detected 1004 during the ON duration 1002a (1004), the WTRU may operate or continue operating in the same power mode (1006), which may include, for example, at least one of monitoring the PDCCH, receiving the PDSCH, and transmitting the PUSCH. The WTRU may receive an indication to the change the power mode. The indication may be received in the current ON duration and/or before the next ON duration 1002b. The message may be transmitted in a DCI in the PDCCH or as a MAC CE or other format. The WTRU may switch the power mode (1008) based on the received indication. The WTRU may make or apply the switch at the start of an ON duration, such as the next ON duration 1002b or at k (or at least k) PDCCH monitoring occasions after the switch indication is received. The WTRU may then proceed with data reception (1110) during the ON duration 1002b.

In embodiments, a WTRU may determine a receiver component, a set of receiver components or a power mode based on a timer. For example, a WTRU may use a first receiver component, set of receiver components or power mode to monitor the PDCCH in an ON duration or active time when a timer is running. When the timer expires, the WTRU may switch to a second or fall-back receiver component, set of receiver components or power mode. The second or fall-back receiver component, set of receiver components, or power mode may have better coverage than the first receiver component, set of receiver components or power mode. If the first receiver component, set of receiver components, or power mode is already a fall-back receiver component, set of receiver component or power mode, the inactivity timer may stop or reset.

A first receiver component, set of receiver components or power mode may have a first number of RF chains active. A fall-back receiver component, set of receiver components or power mode may have a second number of RF chains active where the first number may be smaller than the second number. The second number may be a large number or the largest number that may be supported by the WTRU based on WTRU capability. The fall-back receiver component, set of receiver components or power mode may support a maximum modulation order that may be higher than that supported by the first receiver component, set of receiver components or power mode. The fall-back receiver component, set of receiver components or power mode may support a highest maximum modulation order that the WTRU may support based on WTRU capability.

In embodiments, a WUS may be used with DRX to save power. As an example, a WUS may precede an ON duration of a DRX cycle. A WTRU may monitor one or more PDCCHs during the ON duration or active time, for example in one or more PDCCH occasions or monitoring occasions, when a WUS is detected.

In embodiments, a WTRU may determine a receiver component, set of receiver components or power mode for monitoring the PDCCH in an ON duration or active time based on an associated WUS. The associated WUS may indicate which receiver component, set of receiver components or power mode to use. For example, one or more WUSs may be used, and, if a WTRU receives a first WUS, the WTRU may use or turn-on a first receiver component, set of receiver components or power mode. If the WTRU receives a second WUS, the WTRU may use or turn-on a second receiver component, set of receiver components or power mode.

One or more WUSs may be based on preambles, and a WTRU may blindly detect the preambles. If a first preamble is detected, a WTRU may use a first receiver component, set of receiver components or power mode, and the WTRU may use a second receiver component, set of receiver components or power mode if a second preamble is detected FIG. 11 is a signal diagram 1100 of an example of a WUS determining a power mode of associated PDCCH monitoring occasions and a set of aggregation levels for the PDCCH monitoring. In the example illustrated in FIG. 11, the WUS may indicate the number of RF chains to turn on or the power mode to use. For example, the WUS 1102 may be used to wake up the WTRU in a first power mode while a second WUS 1104 may be used to wake up the WTRU in a second power mode.

A set of aggregation levels to be monitored in a certain search space may be determined based on the power mode indicated by the WUS. For example, a search space may be configured with one or more sets of aggregation levels. Each set of aggregation levels may be associated with a power mode. Based on the indicated power mode, a WTRU may determine the set of aggregation levels for PDCCH monitoring in the search space. For a first power mode, larger aggregation levels may be used, for example larger than for a second power mode. Larger levels may, for example, be used for a low power mode since the receiver capability may be limited, for example, due to use of less active RF chains. For a second power mode, smaller aggregation levels (e.g., a smaller maximum aggregation level) may be used, for example, since the full receiver capability may be supported.

In other embodiments, a WUS may determine a first receiver component, set of receiver components or power mode for PDCCH monitoring, for example in the associated ON duration, active time or one or more associated PDCCH monitoring occasions or PDCCH occasions. A WTRU may detect or receive a PDCCH, for example in the associated ON duration, active time, or PDCCH monitoring occasions. The PDCCH may indicate a second receiver component, set of receiver components or power mode to use for the associated PDSCH reception.

The first receiver component, set of receiver components or power mode and the second receiver component, set of receiver components or power mode may be the same, for example when the first receiver component, set of receiver components or power mode is a high or normal power mode.

In embodiments, a WUS may include a sequence or a combination of two or more sequences. If two or more sequences are used, at least one of the following may be used to generate the WUS: scrambling the sequences, time division multiplexing of the sequences, and frequency division multiplexing of the sequences. At least one of the constituent sequences of the WUS may indicate the power mode. For example, if two sequences are scrambled to generate a WUS, one of the sequences may indicate the power mode.

In some embodiments, a radio performance state may be determined implicitly when a WTRU receives downlink control information indicating a DL assignment or UL grant that cannot be followed by the WTRU based on the current radio performance state or capabilities. For example, upon reception of a DCI indicating a change of active bandwidth part (e.g., indicated BWP index different from the active BWP) if the DCI indicates a PDSCH or PUSCH that starts before the end of an allowed switching gap, a WTRU may switch to a configured radio performance state. For another example, a radio performance state may be implicitly determined upon reception of a DCI with a carrier indicator field that does not correspond to any configured carrier. In this case, the value of the field may map to an index of the radio performance state. For another example, a radio performance state may be implicitly determined upon reception of an assignment or grant with a codepoint corresponding to a reserved or invalid value (e.g., for the antenna port field). For another example, a radio performance state may be implicitly determined upon reception of an assignment or grant with invalid HARQ information, such as when receiving a HARQ process index larger than the configured number of HARQ processes. For another example, a radio performance state may be implicitly determined upon reception of an assignment or grant indicating invalid resources.

When the radio performance state is determined based on one of the above examples, the WTRU may switch to a default radio performance state regardless of the contents of the DCI. Alternatively, the WTRU may switch to a radio performance state indicated by the value or values of at least one field.

In some embodiments, the performance state of a WTRU may contradict the information carried in the data scheduling DCI, resulting in a mismatch. Such mismatch may happen, for example, if the WTRU misses signaling that determines the performance state. For example, in some embodiments, a WTRU may be configured to deactivate certain entries of the TDRA table. For example, the entries with k0 (k2) that are below a threshold k0min (k2min) may be deactivated. In this context, deactivation may imply that the WTRU shall not expect to be scheduled with the deactivated entries. It may be assumed that the k0min (k2min) is provided to the WTRU via L1, L2, or higher layer signaling. Similarly, a WTRU may be configured to deactivate certain entries of the CSI reporting trigger state list. For example, the entries with X (X is the aperiodic CSI-RS triggering offset) that are below a threshold Xmin may be deactivated. In this context, deactivation may imply that the WTRU shall not expect to be receiving the CSI-RS corresponding to the deactivated entries.

If a WTRU, for example, expects to be scheduled with k0 (k2)>0 slots and X>0 slots, then it may enter micro sleep mode as soon as a PDCCH in the current slot is received unless it was scheduled to perform some other operation by the PDCCH of a previous slot. A mismatch may occur if a WTRU is configured with k0min but receives a data scheduling DCI indicating a k0 where k0<k0min. Similarly, a mismatch may occur if a WTRU is configured with k2min but receives a data scheduling DCI indicating a k2 where k2<k2min. A mismatch may also occur if a WTRU is configured with Xmin but receives a data scheduling DCI indicating an X where X<Xmin.

When a mismatch occurs, in some embodiments, a WTRU may be expected to switch from the current performance state to the performance state associated with the k0/k2/X values indicated in the data scheduling DCI. For example, a WTRU that is configured with k0min=k2min=Xmin=1 slot and operating in a power saving state may switch to another performance state (e.g. non-power saving state) if it receives a data scheduling DCI indicating at least one of k0/k2/X to be 0 slots. As part of the performance state behavior, for example, a WTRU that has been provided with a k0min/k2min/Xmin and receives a data scheduling DCI containing k0<k0min and/or k2<k2min and/or X<Xmin may set the new value of k0min/k2min/Xmin to the received k0/k2/X. Alternatively, it may set the value of k0min/k2min/X to a default value, such as zero slots.

When a mismatch occurs, in some embodiments, a WTRU may send assistance information to the gNB indicating the occurrence of the mismatch. A MAC-CE may be used to transmit such information.

In another embodiment, a WTRU may be configured with k0min (k2min) but receive data scheduling DCI indicating a k0 (k2) where k0>k0min (k2>k2min). This may occur as a result of a scheduling decision or a mismatch. If each scheduling DCI continuously indicates k0>k0min (k2>k2min) over a certain period of time, the WTRU may send assistance information to the gNB indicating the possible occurrence of a mismatch. The same may also apply for X.

In embodiments, a mismatch may occur when a WTRU in a first performance state configured with a certain MIMO rank and/or number of Tx/Rx RF chains receives a data scheduling DCI that indicates a contradicting rank and/or number of RF chains. For example, a WTRU may be configured with Kmax (Kmax being the maximum rank) and/or Rmax (Rmax being the maximum number of active Tx and/or Rx RF chains) but receives a data scheduling DCI indicating K>Kmax and/or R>Rmax. When such mismatch occurs, the WTRU may be expected to switch from the current performance state to a state associated with the information carried in the DCI. The WTRU may also send assistance information to the gNB indicating the occurrence of the mismatch. A MAC-CE may be used to transmit such information. In other embodiments, if a WTRU is continuously scheduled with K (R) that is smaller than Kmin (Rmin) over a certain period of time, it may send assistance information to the gNB indicating the possible occurrence of a mismatch.

In general, when the data scheduling DCI has information that contradicts the performance state of a WTRU, the WTRU may switch its performance state to the state associated with the information contained in the DCI and send an assistance information to the gNB indicating a mismatch if a single occurrence of contradiction is sufficient to establish a mismatch. Alternatively or additionally, the WTRU may send assistance information to the gNB indicating a possible mismatch if a single occurrence of contradiction is not sufficient to establish a mismatch but such contradiction occurs continuously over a specific period of time.

In some embodiments, a WTRU may transmit an acknowledgment or notification that the radio performance state has been changed, for example, as a result of applying one of the embodiments described in the above. The WTRU may transmit the acknowledgment using physical layer, MAC or RRC signaling. For example, an acknowledgment may be transmitted over PUCCH (or as uplink control information (UCI) multiplexed over PUSCH) as a single bit, such as HARQ-ACK, which may be multiplexed with other HARQ-ACK and/or other UCI. In another example, a notification may be transmitted in a MAC control element or RRC message.

The change of state may be signaled using a transmission to be decoded by more than one WTRU. For example, the change of state may be signaled using a PDCCH received from a group-common search space and a C-RNTI assigned to a group of WTRUs. Such transmission may be a power saving signal, examples of which are described above. The WTRU may use at least one of the following embodiments to determine the PUCCH resource over which to transmit the acknowledgment. Such embodiments may also be used for scenarios other than power saving signaling where a change of state is signaled using group signaling.

In some embodiments, the payload of the power saving signal may indicate the PUCCH resource for every WTRU in the group, such as where the power saving signal is WTRU group specific. A WTRU may first identify the location of the group of bits within the DCI that indicate the PUCCH resource that the WTRU is going to use to transmit the ACK/NACK. Each set of bits may indicate a row of a table, and the row may contain information pertaining to the PUCCH resource. The group of bits may indicate non-transmission of ACK/NACK (e.g., by setting the bits to a predetermined value) and the location of the PUCCH resource. For example, assuming 2 bits, 00 may indicate non-transmission of ACK/NACK and 01, 10, and 11 may each indicate a specific PUCCH resource.

The location of the group of bits may be determined by the WTRU using a reference to another bit within the DCI payload. As an example, with 3 WTRUs in the group, each bit in the first 3 bits may indicate whether to wake-up or not for a specific WTRU, and, assuming 2 bits for PUCCH resource indication, the following 2 bits may indicate the PUCCH resource for the $1^{st}$ WTRU, the following 2 bits may indicate the PUCCH resource for the $2^{nd}$ WTRU, and so on. The index of the WTRU (i.e. $1^{st}$, $2^{nd}$, etc.) may either be configured or derived as a function of the WTRU ID.

In some embodiments, a WTRU may be configured with a default radio performance state per BWP. In each on duration, the WTRU may initially monitor a default radio performance state of the active BWP or BWPs. For example, the WTRU may be configured with a default search space or a default CORESET per BWP. In each on duration, the WTRU may initially monitor the default search space or a default CORESET of the active BWP or BWPs.

Upon receiving a PDCCH during a given ON duration or DCI format, a WTRU may change a power savings aspect or radio performance state, for example, without changing its active BWP. For example, upon decoding a PDCCH for the WTRU during a given on duration, the WTRU may increase the number of monitored search spaces or CORESETs in the active BWP. Such increase may be binary, such as where all search spaces or CORESETs are monitored, or gradual, such as dependent on an RRC configuration.

Upon the expiry of a timer, such as a DRX inactivity timer, the WTRU may change a power savings aspect or radio performance state, for example, without changing its active BWP. For example, upon the expiry of the DRX inactivity timer or BWP inactivity timer, the WTRU may reduce the number of monitored CORESETs or the number of monitored search spaces, for example, to only the default search space or the default CORSET of the active BWP or BWPs.

In other embodiments, upon receiving a WUS during a given on duration, a WTRU may change a power savings aspect or radio performance state, without changing its active BWP in some embodiments. For example, upon receiving a WUS during a given on duration, the WTRU may increase the number of monitored search spaces or CORESETs in the active BWP. Such increase may be binary, such as where all search spaces or CORESETs are monitored, or gradual.

A WTRU may further consider the content of PDCCH scheduling information prior to changing a radio performance state (e.g., number of monitored search spaces or CORESETs). For example, prior to changing the radio performance state, the WTRU may consider one or more of the size of the scheduled TB, the logical channel or DRB on which data is scheduled, an aspect of QoS of the scheduled data (e.g., service type or latency involved), and provided characteristics of a scheduled UL grant. In embodiments, a WTRU may consider the size of the UL grant and/or the amount of buffered data. In other embodiments, a WTRU may consider LCP mapping restrictions of the UL grant with respect to the buffered UL data.

The WTRU may further consider one or more of the above metrics to gradually change the radio performance state. For example, the WTRU may consider one or more of the metrics above to determine the number of additional search spaces to monitor, for example, depending on an RRC configuration.

In embodiments, one or more CSI reporting values, ranges, or indexes for a CSI reporting may be determined based on a receiver component, a set of receiver components, or a power mode. Determination may be made by a WTRU.

A CQI table may be determined based on a power mode. For example, a first CQI table may be used for a first power mode, and a second CQI table may be used for a second power mode. A set of modulation orders may be different based on the CQI table. A CQI table for a first power mode may include a subset of modulation orders (e.g., QPSK only), and a CQI table for second power mode may include full set of modulation orders (e.g., QPSK, 16QAM, and 64QAM). The number of entries for a CQI table may be different based on the associated power mode. For example, 3-bit CQI table (8 entries) may be used for a first power mode and 4-bit CQI table (16 entries) may be used for a second power mode.

A full set or a subset of CQI entries in a CQI table may be used based on the power mode. Table 2 shows an example of determining a full set or a subset of CQI entries based on the associated power mode. In the example, power mode 1 uses CQI entries with QPSK, and power mode 2 uses CQI entries with all modulation orders.

The number of CQI bits for a CQI reporting may be determined based on the number of CQI entries in the set or subset determined for the power mode. Alternatively, the number of CQI bits for a CQI reporting may be unchanged based on power mode and determined based on the full set of CQI entries in the CQI table. CQI entry, CQI index, and CQI value may be used interchangeably.

TABLE 2

| CQI index | modulation | code rate × 1024 | efficiency | Power Mode 1 (Low) | Power Mode 2 (High) |
|---|---|---|---|---|---|
| 0 | | | out of range | | |
| 1 | QPSK | 78 | 0.1523 | v | v |
| 2 | QPSK | 120 | 0.2344 | v | v |
| 3 | QPSK | 193 | 0.3770 | v | v |
| 4 | QPSK | 308 | 0.6016 | v | v |
| 5 | QPSK | 449 | 0.8770 | v | v |
| 6 | QPSK | 602 | 1.1758 | v | v |
| 7 | 16QAM | 378 | 1.4766 | | v |
| 8 | 16QAM | 490 | 1.9141 | | v |
| 9 | 16QAM | 616 | 2.4063 | | v |
| 10 | 64QAM | 466 | 2.7305 | | v |
| 11 | 64QAM | 567 | 3.3223 | | v |
| 12 | 64QAM | 666 | 3.9023 | | v |
| 13 | 64QAM | 772 | 4.5234 | | v |
| 14 | 64QAM | 873 | 5.1152 | | v |
| 15 | 64QAM | 948 | 5.5547 | | v |

A maximum reported rank may be limited based on the power mode. For example, a first maximum reported rank (e.g., 4) may be used when a first power mode is determined for a CSI reporting. A second maximum reported rank (e.g., 1) may be used when a second power mode is determined for a CSI reporting. The maximum reported rank, a maximum rank index (RI) value, and a maximum RI may be used interchangeably.

A codebook subset restriction level may be determined based on the power mode. A minimum required CSI computation time for a given CSI reporting setting or CSI reporting configuration may be different based on the power mode. A shorter minimum required CSI computation time may be used for a high power mode and a longer minimum required CSI computation time may be used for a low power mode.

In some embodiments, one or more configured CSI reporting settings, resource settings, and/or CSI reporting configuration may be activated or deactivated based on the power mode used. For example, a CSI reporting setting may be deactivated when one or more conditions are met. Activation and/or deactivation may be performed by a WTRU. A condition may be one or more of the determined receiver component or set of components is or corresponds to a low power mode, the number of antenna ports of the associated NZP-CSI-RS for the CSI reporting is larger than a threshold (e.g., 8), the associated codebook type is Type II, the number of beams to measure for L1-RSRP is larger than a threshold (e.g., 64), and a CSI reporting is a periodic reporting or semi-persistent reporting.

In some embodiments, a set of CSI reporting settings, resource settings, and CSI reporting configuration may be configured for per receiver component, set of receiver components, or power mode. For example, a first set of CSI reporting settings, resource settings, and CSI reporting configurations may be configured or used for a first receiver component, set of receiver components, or power mode. A second set of CSI reporting settings, resource settings, and CSI reporting configuration may be configured for a second receiver component, set of receiver components, or power mode.

A WTRU may report a CSI based on the set of CSI reporting settings, resource settings, and CSI reporting configurations associated with a determined or current power mode. A WTRU may report a CSI based on the set of CSI reporting settings, resource settings, and CSI reporting configuration associated with an indicated power mode. The power mode may be indicated in an aperiodic CSI reporting trigger, or the power mode may be implicitly indicated by the aperiodic reporting request index.

In some embodiments, a same set of CSI reporting settings, resource settings, and CSI reporting configurations may be configured for some or all supported power modes. A WTRU may be requested to report the configured CSI with one or more power modes. For example, a WTRU may be requested to report a CSI based on a power mode. The WTRU may be requested to report a CSI based on the set of power modes supported by the WTRU. If the indicated power mode for a CSI reporting is different from the current power mode, a measurement gap may be provided or used for the CSI measurement. During a measurement gap, a WTRU may or may be allowed to skip monitoring PDCCH.

When a CSI reporting is based on multiple power modes, a delta offset of a CSI measurement may be used across power modes. For example, a reference CQI value may be measured based on a highest CQI value or a CQI value based on the highest power mode within the CQI values for multiple power modes, and delta CQI value for the rest of power modes may be reported.

In some embodiments, a WTRU may measure and report a CSI based on the determined power mode when the measurement resource is available. The WTRU may indicate the associated power mode for or with each CSI report. The WTRU may indicate the identity of the power mode.

One or more PUCCH resources may be configured, and one of PUCCH resources may be determined based on the associated power mode. A WTRU may use the determined PUCCH resources, for example, for CSI reporting.

In some embodiments, a CSI reporting setting, resource setting, or configuration may include an attribute associated with a receiver component, a set of resource components, or a power mode. For example, a first CSI resource may be configured so that the CSI-RS transmitted in that resource may be measured with a first number of RF chains. Another CSI resource may be configured so that the CSI-RS transmitted in that resource may be measured with a second number of RF chains.

Figure 12:
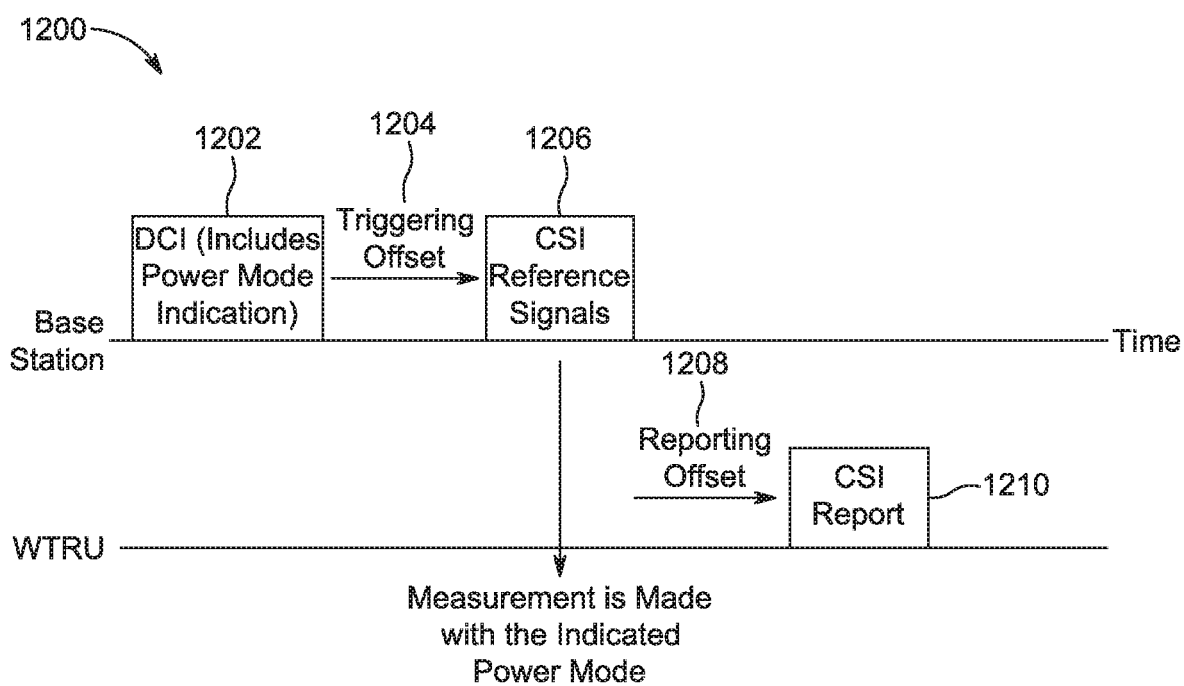
FIG. 12 is a signal diagram of an example of aperiodic CSI reporting triggering with associated power mode indication.

FIG. 12 is a signal diagram 1200 of an example of aperiodic CSI reporting triggering with associated power mode indication. In the example illustrated in FIG. 12, the DCI 1202 includes a power mode indication. The CSI-RS 1206 may be transmitted after an offset time 1204 from the DCI activation. The CSI-RS may be associated with a specific power mode. In embodiments, the DCI may not need to include a power mode indication, such as when a CSI-RS resource is associated with a power mode. The association may be configured by higher layers. A WTRU may be performing a CSI measurement using the CSI-RS reference signals and the indicated power mode. The WTRU may report the measurement in an associated CSI report 1210, for example, a reporting offset 1208 after the CSI RS 1206.

Figure 13:
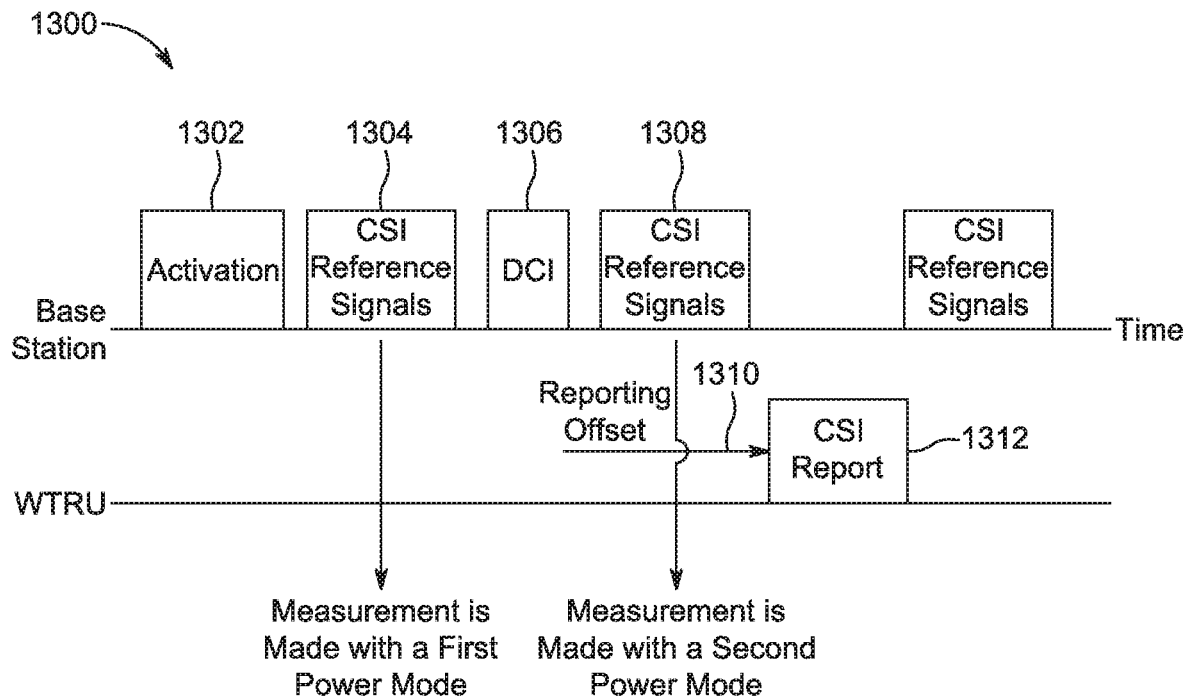
FIG. 13 is a signal diagram of an example of periodic CSI reference signal (CSI-RS) and aperiodic CSI reporting.

FIG. 13 is a signal diagram 1300 of an example of periodic CSI-RS and aperiodic CSI reporting. In the example illustrated in FIG. 13, when the CSI-RS is periodic and the CSI reporting is aperiodic, each CSI resource may be associated with a specific power mode. An activation message or trigger message 1302 may, for example via DCI or higher layers, indicate a power mode that may be used by the WTRU to determine a CSI-RS resource for measurement. The WTRU may make the measurement of the CSI reference signals 1304 and 1308 using the power mode or modes indicated in the activation of trigger message 1302. In the example illustrated in FIG. 13, the WTRU measures the CSI-RS 1304 using a first power mode and measures the CSI-RS 1308 using a second power mode. A DCI 1306 may trigger the WTRU to report a CSI corresponding to one or more specific power modes. A reporting offset 1310 after the DCI 1306, the WTRU may send the CSI report 1312, which may be for one or both power modes.

Figure 14:
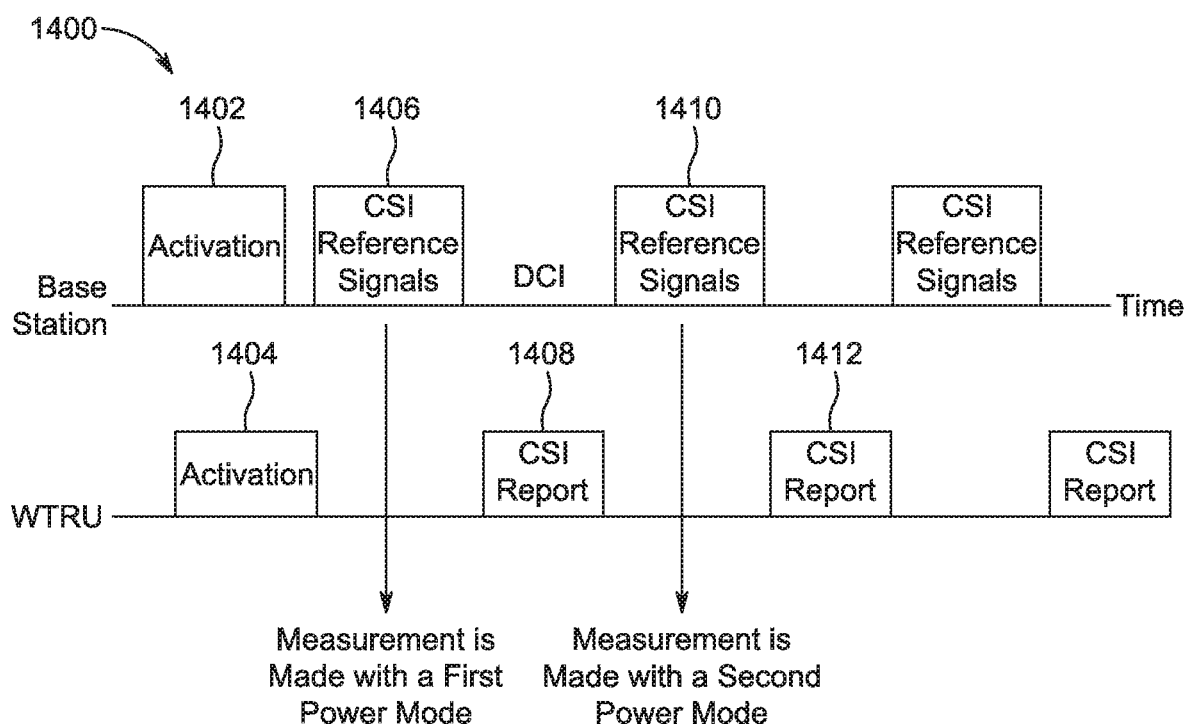
FIG. 14 is a signal diagram of an example of periodic CSI-RS and periodic CSI reporting.

FIG. 14 is a signal diagram 1400 of an example of periodic CSI-RS and periodic CSI reporting. When the CSI-RS is periodic and the CSI reporting is also periodic, a CSI-RS resource may be associated with a specific power mode. In the example illustrated in FIG. 14, for example, the activation message 1402 indicates that the first power mode is associated with the CSI-RS 1406 and the second power mode is associated with the CSI-RS 1410. When the WTRU receives the activation message 1402, the WTRU may activate 1404 and measure the CSI-RS 1406 using the first power mode and measure the CSI-RS 1410 using the second power mode. The activation message 1402 may request or command the WTRU to report the CSI corresponding to the indicates power modes. Accordingly, after measuring the CSI-RS 1406, the WTRU sends the CSI report 1408, and after measuring the CSI-RS 1410, the WTRU sends the CSI report 1412, without any further signaling needed to triggering the CSI reporting.

The measurement the WTRU performs may not be limited to CSI. For example, the WTRU may measure RSRP or another quantity. A WTRU may use CSI-RS or some other reference signals to perform measurements. For example a WTRU may use SS-PBCH blocks to perform measurements. Each SS/PBCH block may be associated with a specific power mode. A WTRU may perform a measurement of an SS/PBCH block while operating with the associated power mode. WTRU measurements may include coverage level.

A power mode may determine the maximum number of data streams a WTRU may receive. A maximum or minimum number of RF chains that may be turned on or used or the power mode that may be used may be indicated to a WTRU. The indication may be based on explicit indication or implicit indication as described in detail above. The indication may be carried in a DCI format in PDCCH, in a MAC CE, or in a configuration message from the higher layers. A WTRU may operate with an indicated number of RF chains or power mode, for example in response to or based on the indication or based on receiving the indication.

In embodiments, a timer may be used for a power mode determination. The WTRU may operate in the power mode until the power mode is modified or deactivated, for example via a subsequent indication or based on a timer expiry. The subsequent indication may overwrite or supersede a previous indication. The WTRU may operate in the power mode until another power mode activated, for example via a subsequent indication or based on a timer expiry. The subsequent indication may overwrite or supersede a previous indication.

A timer may be configured, for example by a gNB, and/or used by a WTRU, when a power mode is configured, activated or used. The timer may be used for a subset of power modes. For example, the timer may be used for power modes other than a normal power mode. The normal power mode may be considered as a fallback power mode. When the timer expires, a WTRU may switch to the normal power mode.

A timer may be started or restarted by a WTRU when a maximum rank or power mode is received or determined by the WTRU and/or indicated or configured by the gNB. The timer value may be indicated or determined when the maximum rank or power mode is indicated and/or when the timer is started or restarted. The indication may include or identify the timer value. Alternatively, a timer value may be associated with a maximum rank or power mode. Indication of a maximum rank or power mode may implicitly indicate the timer value based on the association. When using a maximum rank or a power mode, the WTRU may use the timer value associated with the maximum rank or power mode.

When the timer expires, the WTRU may stop using the maximum rank limitation or the power mode that may be associated with the timer. The WTRU may use a different maximum rank or a power mode that may be configured or otherwise known. The WTRU may use a first set of ranks when the timer is running or not started and a second set of ranks when the timer expires or is not running. The maximum rank in the first set of ranks may be lower than the maximum rank in the second set of ranks. When the timer expires, the WTRU may use, resume, or switch to a default, fallback, predetermined, or other operation mode, for example the normal power mode.

Figure 15:
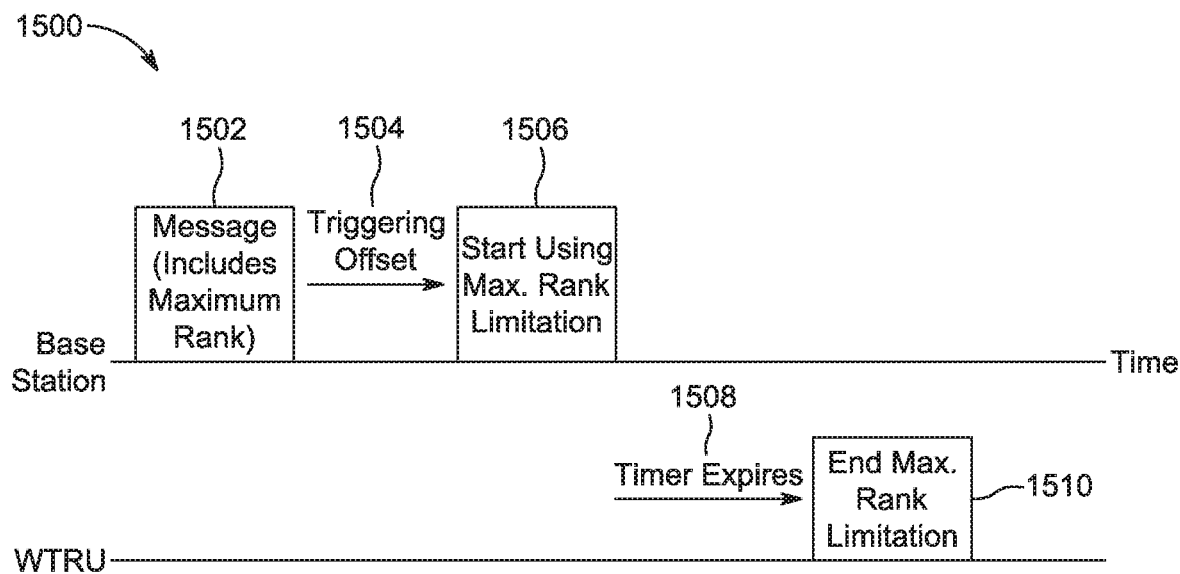
FIG. 15 is a signal diagram of an example maximum rank restriction with a timer.

FIG. 15 is a signal diagram 1500 of an example maximum rank restriction with a timer. In the example illustrated in FIG. 15, a base station, such as a gNB, provides a message 1502 that includes a maximum rank. A trigger offset 1504 after the message 1502, the base station may begin using the maximum rank limitation (1506), and a WTRU may set a timer. When the timer expires (1508), the maximum rank limitation may end (1510).

In other embodiments, a WTRU may receive a first indication or message containing or identifying a first maximum rank or power mode. The WTRU may operate with the first maximum rank or power mode, for example after receiving the first indication or message. The WTRU may receive a second indication or message containing or identifying a second maximum rank or power mode. The second indication or message may overwrite or supersede the first indication or message. The second maximum rank or power mode may overwrite or supersede the first maximum rank or power mode. The WTRU may operate with the second maximum rank or power mode, for example after receiving the second indication or message.

In other embodiments, a WTRU may receive a DCI in a PDCCH for resource allocation, and the rank information in the DCI may be higher than the maximum rank that was previously sent, configured or received. When the WTRU receives a rank that is higher than the maximum rank previously sent, configured or received, the WTRU may assume that the existing maximum rank limitation has been voided and start or resume a default mode. This default mode may, for example, be normal power mode, a mode with all RF chains activated, and/or a mode with the maximum rank set to the maximum possible allowed by the WTRU capability or WTRU hardware. Limitation and restriction may be used interchangeably herein. In embodiments, one of the following may be determined based on the maximum rank: a DM-RS configuration and a power level of RS.

A BWP may be determined based on the maximum rank. There may be at least one BWP configured, and each BWP may be associated with a least one of a maximum rank, a maximum number of RF chains, a power mode and/or another parameter relate to WTRU power consumption. When a BWP is activated, a WTRU may assume that one, more or all of the associated parameters are valid for the duration of transmission and/or reception within the BWP. The assumption may not apply for a parameter that is overwritten or reconfigured, for example by the gNB, for example via DCI, MAC, or higher layer signaling. When a parameter is overwritten or reconfigured with a new value, the WTRU may use the new value.

A CORSET configuration may be determined based on the maximum rank. There may be at least one CORESET configuration, and each configuration may be associated with at least one of the following parameters: a maximum rank, a maximum number of RF chains, a power mode; and/or another parameter related to WTRU power consumption. When a CORSET is configured, a WTRU may assume that one, more or all of the associated parameters are valid for the duration of transmission or when monitoring and/or receiving the CORESET. The assumption may not apply for a parameter that is overwritten or reconfigured, such as by the gNB, for example via DCI, MAC, or higher layer signaling. When a parameter is overwritten or reconfigured with a new value, the WTRU may use the new value.

Within a CORESET, there may be multiple search spaces where the WTRU monitors the PDCCH. Each search space may be associated with one or more parameters described herein, such as one or more parameters related to WTRU power consumption. When monitoring a search space or when monitoring or receiving a PDCCH in a search space, the WTRU may use one or more associated parameters that may be related to WTRU power consumption.

A WTRU may be configured with one or more levels of power saving. For example, a WTRU may be configured with deep sleep mode (e.g., first power mode) and/or a partial sleep power saving mode (e.g., second power mode). In the deep sleep power saving mode, one or more entire RF chains may be turned off. In the partial sleep mode, certain functions within one or more RF chains may be shut down. For example, an RF function that may need or use a longer warm up time may stay on in the partial sleep mode.

During the C-DRX operation, a WTRU may perform radio link monitoring (RLM) using all of its available receive antennas ($N_{RX}$) over the DRX ON period. A WTRU may rely on radio link measurements to adapt the dimension of the RX RF chain according to the link quality. Herein, RF chain may refer to an actual RF signal chain, or some specific functions of an actual RF chain or the entire or some part of an antenna subsystem.

In embodiments, a WTRU in the C-DRX mode may be configured with a minimum allowed number of receive antennas ($N_{RLM\_min}$) for radio link monitoring where $N_{RX} \geq N_{RLM\_min} \geq 1$. The minimum allowed number of receive antennas ($N_{RLM\_min}$) may be defined based on one or more criteria such as traffic type, reliability or, downlink transmission rank. In embodiments, if the measured downlink radio link quality is greater than a threshold ($Q_{in\_Ant\_K}$) for a specified period of time ($T_{in\_Ant}$), one or more of the following may apply: a WTRU may reduce the number of active Rx RF functions, chains and/or Rx antennas from $N_{RX}$ to K, where K≥$N_{RLM\_min}$ or a WTRU may change its power mode from a higher power mode to a lower power mode. In embodiments, the power mode may consume more power/ energy than a lower power mode.

Figure 16:
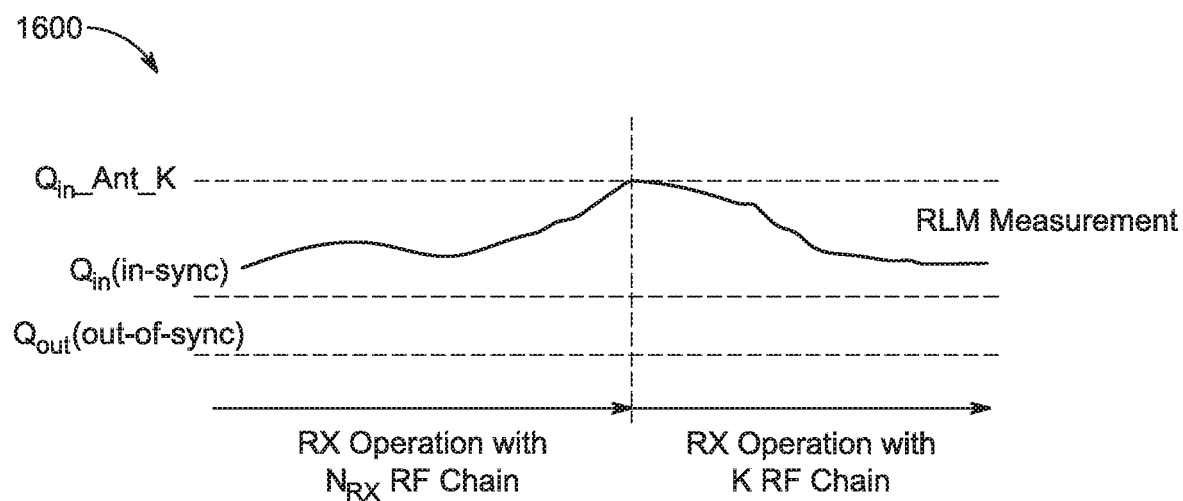
FIG. 16 is a graph showing an example of the number of receive radio frequency (Rx RF) chains decrementing based on radio link monitoring (RLM) measurement.

FIG. 16 is a graph 1600 showing an example of the number of Rx RF chains decrementing based on RLM measurement. In the example illustrated in FIG. 16, the number of Rx RF chain is reduced when the RLM measurement exceeds the threshold $Q_{in\_Ant\_K}$. As illustrated in FIG. 16, by reducing the number of antennas, the RLM measurement has ceased crossing the $Q_{in\_Ant\_K}$ level. However, it still remains above the required $Q_{out}$ threshold to stay in-sync.

The $Q_{in\_Ant\_K}$ threshold may be defined as a relative offset from $Q_{in}$ or $Q_{out}$, where $Q_{in}$ and $Q_{out}$ are the in-sync and out-of-sync thresholds, respectively. In an example, $Q_{in\_Ant\_K}$ may be defined as $Q_{in\_Ant\_K}=Q_{in}+\Delta Q$, or alternatively $Q_{in\_Ant\_K}=Q_{out}-\Delta Q$. A WTRU may expect the relative offset, $\Delta Q$, to be defined based on one or more criteria, such as traffic type, reliability, or downlink transmission rank. For example, a URLLC WTRU that deals with high reliability transmissions may select or be configured with a larger $Q_{in\_Ant\_K}$ value than an mMTC WTRU that is expected to have a longer battery life.

In embodiments, if the measurement downlink radio link quality goes below a threshold ($Q_{out\_Ant\_K}$) for a specified period of time ($T_{out\_Ant}$), the WTRU may increase the number of active Rx RF functions, chains and/or Rx antennas back to the default dimension of $N_{RX}$.

Figure 17:
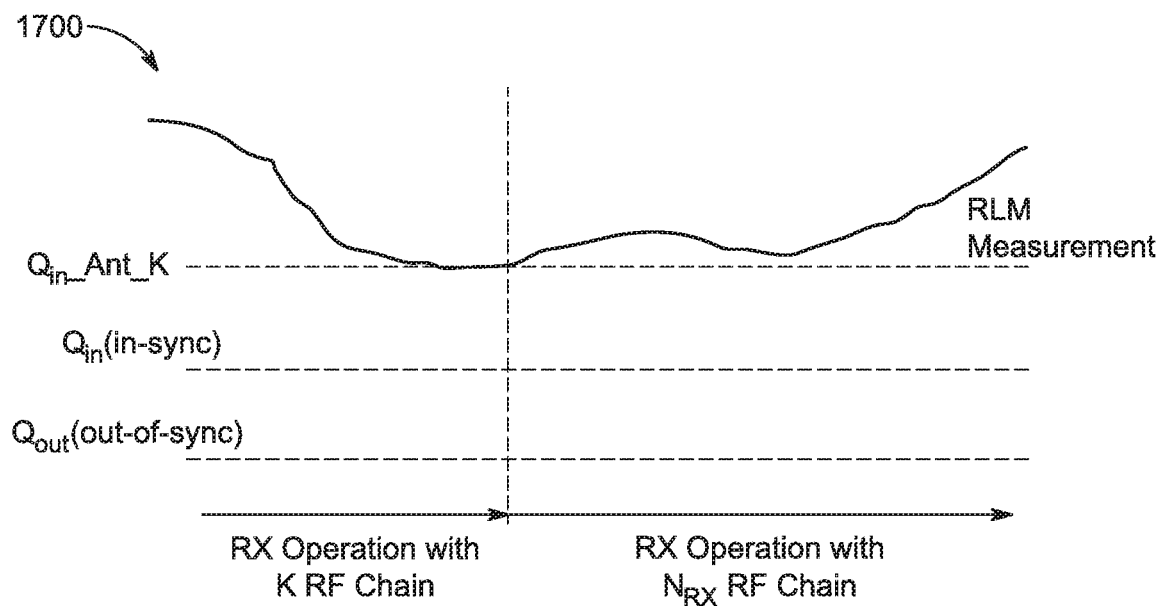
FIG. 17 is a graph showing a number of Rx RF chains incrementing based on RLM measurement.

FIG. 17 is a graph 1700 showing a number of Rx RF chains incrementing based on RLM measurement. In the example illustrated in FIG. 17, the number of active RF chains is reversed to the default dimension $N_{RX}$ as the RLM measurement indicates a downward change. As shown in FIG. 17, the RLM measurement enhances. In embodiments, $T_{out\_Ant}$ may be selected shorter than $T_{int\_Ant}$ to accommodate power up time for RF components. In some embodiments, the timers $T_{in\_Ant}$ and $T_{out\_Ant}$ may be reset with the expiry or start of the T310 timer used for RLM measurement.

In embodiments, a WTRU may indicate a change in the number of Rx RF chains used by the WTRU to the gNB. Following the indication, a WTRU may expect a change in PDCCH aggregation level. The change in PDCCH aggregation may be definite or indefinite. A WTRU may expect the change in PDCCH aggregation level to be effective in n+k slot, where n and k are the current slot and offset indices, respectively. In embodiments where there is a definite change in PDCCH aggregation, a WTRU may attempt PDCCH decoding using one or two specific larger aggregation levels. For example, a WTRU may only expect one or two of the highest available aggregation levels for its PDCCH decoding. Alternatively, in embodiments where there is an indefinite change in PDCCH, a WTRU may only prioritize larger aggregation levels for PDCCH blind decoding.

In other embodiments, a WTRU may indicate the possibility of a change in the number of Rx RF chains to the gNB. Following the indication, a WTRU may be provided with an indication to proceed with a change. If the WTRU does not receive a change or a confirmation of its suggested change, the WTRU may maintain its current Rx RF configuration.

On a condition that a WTRU is allowed to proceed with the change, it may also assume to be receiving further information related to PDCCH decoding, such as PDCCH aggregation level. For example, a WTRU may be provided with an indication that there will not be a change in aggregation level. Alternatively, a WTRU may be provided with an indication to use a lager aggregation level for its PDCCH decoding.

In other embodiments, a power mode may be associated with a set of one or more measurement parameters or requirements. For example, a power mode may be associated with at least one of the following measurement parameters for a particular measurement: a measurement reporting period (e.g., for a periodic measurement), a timer, a counter, a measurement threshold that may be used to determine when to trigger a measurement report, an accuracy requirement, a time duration over which an accuracy requirement may be met, and/or a measurement sampling requirement such as a minimum number of measurement samples to make over a period of time, for example to average to determine the measurement value.

A first power mode may be associated with a first measurement parameter or a first set of measurement parameters for a measurement. A second power mode may be associated with a second measure measurement parameter or a second set of measurement parameters for the measurement. A WTRU may use the first measurement parameter or the first set of measurement parameters when operating in the first power mode. The WTRU may use the measurement parameter or the second set of measurement parameters when operating in the second power mode. The first measurement parameter and the second measurement parameter may be the same parameter with a different value, rule or requirement. The first and second sets of measurement parameters may comprise a same set of parameter types where at least one parameter type in the first set may have a different value, rule or requirement than the same parameter type in the second set.

There may be multiple levels (e.g., level 1, level 2, level 3) of sleep or power savings modes, such as no sleep, full sleep, normal or regular sleep, deep sleep, or partial sleep. A power mode may correspond to a level of sleep.

A measurement parameter for a second power mode may be relaxed or less stringent than the measurement parameter for a first power for a certain measurement. For example, a time duration over which an accuracy requirement may be met for a measurement may be longer for a second power mode than a first power mode.

One or more measurement parameters for a power mode may be set by specification. One or more measurement parameters for a power mode may be configured. One or more measurement parameters for a power mode may be a function of the power mode. A WTRU may determine a measurement parameter for a measurement based on a power mode that the WTRU may be using. A WTRU may make and/or report the measurement using or in compliance with the determined power mode.

A measurement may be a least one of CQI, SINR, L1-RSRP, RSRP, RSRQ, or pathloss. A measurement may be of a reference signal or synchronization signal, such as CSI-RS, ZP-CSI-RS, NZP CSI-RS, SSS, or DM-RS. A measurement may be an SS/PBCH block measurement.

A power mode may be associated with one or more timers, counters, measurement parameters, and/or thresholds that may be related to in and/or out of synchronization determination. A WTRU may use one or more timers, counters, measurement parameters, and/or thresholds that may be related to in and/or out of synchronization determination to make an in and/or out of sync determination based on a power mode a WTRU may be using.

In other embodiments, in addition to, or alternatively to, the use of power modes for power control, power-efficient tracking may be used. In some embodiments, a WTRU may process a re-synchronization signal (RSS) transmitted by a base station, such as a gNB, in conjunction with a DRX ON duration time interval. The RSS may be used for the purpose of at least one of AFC, time synchronization, beam management or CSI measurement.

In some embodiments, the RSS is transmitted by the gNB and processed by the WTRU in an identified time window. The RSS reception time window may be linked to the DRX on-duration for a WTRU either by configuration or by application of processing rule. For example, the RSS reception time window may be set to start N1 OFDM symbols prior to the beginning of the first timeslot of a DRX on-duration window and is set to end N2 OFDM symbols before. Alternatively, the RSS reception time window starts N1 timeslots before and ends N2 timeslots before the DRX on-duration for the device. In embodiments, N2 may be set to zero. Alternatively, the RSS reception window may be configured or applied to the first timeslot or timeslots of a DRX ON duration. It may not be necessary that the RSS occupy the entire RSS reception time window. The RSS may be present over the entire time interval [N1, N2], or it may start only during this time interval. The RSS may require less time for transmission than provided by the configured or applied RSS reception time window. The configuration of the RSS reception time window for use by the WTRU may be linked to the configured DRX parameters. The RSS reception time window may have a larger minimum size when DRX counters and/or timers are configured.

In other embodiments, the RSS is transmitted by the gNB and processed by the WTRU in an identified set of frequency resources. The RSS reception bandwidth window for use by a WTRU may be either known by configuration or by application of a processing rule in the WTRU.

For example, the RSS reception bandwidth window may be set to correspond to the currently active DL BWP for which the WTRU processes the incoming PDCCH on a DRX on-duration window. Alternatively, it may correspond to an identified subset of frequency domain resources linked to the active DL BWP of the WTRU. Alternatively, the RSS reception bandwidth window may correspond to a determined subset of frequency resources, contiguous or not contiguous, and determined by configuration through RRC. In embodiments, multiple RSS reception bandwidth windows may be configured for a WTRU.

When the RSS is transmitted by the gNB and processed by the WTRU in an identified time window, such as described above, coarse frequency/timing tracking functionality in the WTRU may be implemented while incurring minimal wake-up overhead. Unlike conventional NR technology, the WTRU does not need to wake up and power on significant parts of its RF and BB receiver chains for the purpose of AFC, even though the next DRX on-duration period may be many tens or hundreds of milliseconds away. By providing an RSS scheduled to start a couple of OFDM symbols or timeslots just prior to or coinciding with the beginning of the DRX-on duration window, the WTRU may power on its RF and BB parts only when needed. Similarly, by processing the transmitted RSS in frequency resources linked to the active DL BWP, the WTRU may avoid frequency re-tuning in order to receive and process the SSB or SSBs that do not usually coincide with the active DL BWP. Re-tuning the WTRU reception bandwidth costs power incurs a penalty in terms of a longer receiver on-time for BWP switching. Further, the RSS may also be employed for the purpose of beam management.

In other embodiments, the re-synchronization signal may be process by the WTRU in a set of identified REs in an RSS reception time and frequency window. In embodiments, the RSS may be transmitted as one or a set of REs configured a as CSI-RS resource set. For example, the RSS may be configured as a CSI-RS resource set. The RSS may be configured as a CSi_RS resource set where every 4th OFDM symbol over a configurable transmission interval of one or multiple timeslots may be used with every RSS-carrying OFDM symbol carrying 3 RSS subcarriers. When configured as a CSI-RS resource set, depending on the type of CSI-RS resources configured, zero-power or non-zero power, dynamic signaling in the DCI may be used to rate-match PDSCH transmissions to other devices around the RSS resources. Similarly, existing configuration messages in use for CSI-RS may be reused to indicate the RSS configuration.

In other embodiments, the RSS may be transmitted over a contiguous frequency bandwidth occupying more than one RB and occupying one or more of multiple OFDM symbols, not necessarily contiguously. For example, the RSS may be transmitted as a length 127 m-sequence occupying 12 RBs over an OFDM similar to the PSS but using a distinct m-sequence generator. These RSS carrying symbols may be repeated or a set of symbols may be used. In such embodiments, an existing implementation may largely be reused in the device to realize the RSS functionality. Further, by using RSS in the form of CSI-RE resource sets defined at RE-level, existing R15 NR signaling may be used to rate-match the PDSCH of other devices around the RSS, which may avoid decoding degradations and scheduling restrictions.

In other embodiments, the RSS sequence may be generated using an identifier configured by the gNB or determined by the WTRU. For example, an identifier linked or identical to the C-RNTI in use by the WTRU may be used to determine the RSS encoding sequence. This may include generation of RSS sequence elements or operations such as scrambling the RSS sequence with a second sequence. A reception time instant parameter, such as a symbol or timeslot number may be used to derive the RSS sequence. An explicitly singled value may be used to determine the RSS sequence. In such embodiments, interference may be randomized and reception quality of the RSS may be improved.

In some embodiments of WTRU receiver processing when operating in the presence of a configured RSS occurrence, a WTRU may determine a DRX ON duration, determine a processing interval for reception of an RSS, configure its receiver for reception of an RSS in a set of identified time and frequency resources, determine the presence or absence of RSS, determine an oscillator and/or timing correction value, and then apply the correction value and proceed to PDCCH reception. Any of these steps may imply several more known intermediate steps, for example channel estimation occurring while processing PDCCH candidates of a received CORESET.

In some embodiments, use of the RSS by the WTRU may be determined to be applicable when a condition is met. For example, the RSS may be present and part of WTRU receiver processing for a DRX ON duration, when a timer or counter value has expired since the last time that data or control or suitable RS or SSB was received by the WTRU while in active time or during DRX ON duration. The duration of the timer may be pre-defined or configured by higher layers. In this way, the maximum amount of time and maximum oscillator drift incurred by a WTRU not waking up for coarse AFC may be controlled to not exceed some acceptable value. The gNB, knowing about the DRX ON duration or active time of a WTRU, may transmit an RSS to the WTRU if a counter or timer since last data/control reception exceeds a given value. It may not transmit an RSS if below the given value. This may minimize overhead from network perspective.

In another example, the WTRU may determine the need for or presence of an RSS linked to the DRX ON duration based on a signal level reception threshold. For example, the RSS may be present and part of WTRU receiver processing if the WTRU-experienced DL pathloss is in excess of a threshold value, which may include an offset value. The eNb may configure a signal threshold above which no RSS may be transmitted and below which an RSS is linked to the determined DRX ON duration.

In another example, the RSS may be present only on a condition that it is not in active time or that one or a plurality of DRX timers are not running, such as at least one of an inactivity timer, a UL or DL retransmission timer, and a DL or UL HARQ RTT timer. In another example, the RSS may be configured to be present only when the active BWP is one of a subset of the configured BWPs.

Figure 18:
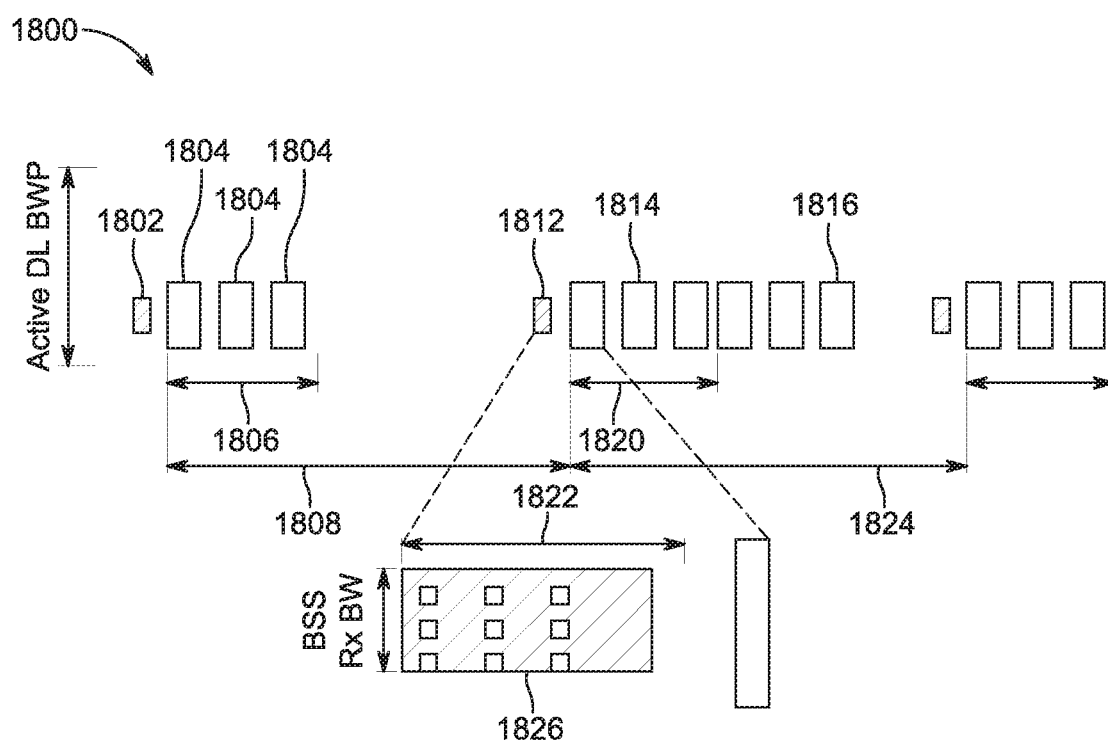
FIG. 18 is a signal diagram of an example of processing a re-synchronization signal (RSS) in conjunction with a DRX ON duration time interval.

FIG. 18 is a signal diagram 1800 of an example of processing an RSS in conjunction with a DRX ON duration time interval. In the example illustrated in FIG. 18, a WTRU may receive an RSS 1802 in one of an identified time window or set of frequency resources linked to the DRX ON duration 1806 of a DRX cycle 1808. The RSS may be used for AFC, time synchronization, beam management and/or CSI measurement just prior to the start of the ON duration 1806. The WTRU may monitor PDCCH monitoring occasions 1804 during the ON duration 1806. The WTRU may also receive an RSS 1812 during an RSS reception window 1822 just prior to the ON duration 1820 of the DRX cycle 1824. An RSS aperiodic NZP-CSI-RS resource set 1826 is also shown in detail for the RSS reception window 1822. The device may be scheduled during PDCCH monitoring occasion 1814, and a timer may be started or re-started. The timer may expire (1816), and the device may stop monitoring the PDCCH occasions in response to the timer expiry.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, implemented in a wireless transmit/receive unit (WTRU), the method comprising:
   receiving layer 1 (L1) signaling that indicates a minimum slot offset value;
   decoding a downlink control information (DCI) in a physical downlink control channel (PDCCH) transmission in a search space associated with a CORESET in a slot;
   obtaining, from the decoded DCI, an index for the WTRU to use to obtain a physical downlink shared channel (PDSCH) time domain resource allocation (TDRA) from a TDRA table;
   retrieving, from the TDRA table, a particular slot offset value identified by the index;
   based on at least the CORESET and type of the search space, determining to apply the minimum slot offset value, wherein applying the minimum slot offset value comprises comparing the particular slot offset value to the minimum slot offset value; and
   on a condition that the particular slot offset value is greater than or equal to the minimum slot offset value, receiving a PDSCH transmission scheduled by the PDCCH transmission.

2. The method of claim 1, further comprising:
   not receiving the PDSCH transmission scheduled by the PDCCH transmission on a condition that the particular offset value is less than the minimum offset value.

3. The method of claim 1, further comprising:
   determining that a minimum aperiodic channel state information reference signal (CSI-RS) offset for aperiodic CSI-RS reporting is equal to the minimum slot offset value received in the L1 signaling for a bandwidth part (BWP).

4. The method of claim 3, further comprising:
   decoding another DCI and obtaining a CSI-RS reporting trigger from the decoded other DCI, the CSI-RS reporting trigger identifying a resource set that is configured with a particular trigger offset for the aperiodic CSI-RS reporting;
   comparing the particular trigger offset to the minimum aperiodic CSI-RS offset; and
   on a condition that the particular trigger offset is less than the minimum aperiodic CSI-RS offset, not reporting CSI associated with the identified resource set in response to the CSI-RS reporting trigger.

5. The method of claim 4, wherein the WTRU is configured with a CSI-RS report trigger state list that includes one or more entries, each of the one or more entries comprising one or more resource sets and each of the one or more resource sets includes identification of a set of time-frequency resources and a trigger offset for the resource set.

6. The method of claim 4, further comprising reporting CSI associated with the identified resource set in response to the CSI-RS reporting trigger on a condition that the particular trigger offset is greater than or equal to the minimum aperiodic CSI-RS offset.

7. A wireless transmit/receive unit (WTRU) comprising:
   a transceiver; and
   a processor,
   wherein the transceiver and the processor are further configured to receive layer 1 (L1) signaling that indicates a minimum slot offset value, wherein the transceiver and the processor are further configured to decode a downlink control information (DCI) received in a physical downlink control channel (PDCCH) transmission in a search space associated with a CORESET in a slot,
   wherein the transceiver and the processor are further configured to obtain, from the decoded DCI, an index for the WTRU to use to obtain a physical downlink shared channel (PDSCH) time domain resource allocation (TDRA) from a TDRA table,
wherein the transceiver and the processor are further configured to retrieve, from the TDRA table, a particular slot offset value identified by the index,
wherein the transceiver and the processor are further configured to, based on at least the CORESET and type of the search space, determine to apply the minimum slot offset value,
wherein applying the minimum slot offset value comprises comparing the particular slot offset value to the minimum slot offset value, and
wherein the transceiver and the processor are further configured to, on a condition that the particular slot offset value is greater than or equal to the minimum slot offset value, receive a PDSCH transmission scheduled by the PDCCH transmission.

8. The WTRU of claim 7, wherein the transceiver and the processor are further configured to not receive the PDSCH transmission scheduled by the PDCCH transmission on a condition that the particular slot offset value is less than the minimum slot offset value.

9. The WTRU of claim 7, wherein the transceiver and the processor are further configured to determine that a minimum aperiodic channel state information reference signal (CSI-RS) offset for aperiodic CSI-RS reporting is equal to the minimum slot offset value received in the L1 signaling for a bandwidth part (BWP).

10. The WTRU of claim 9, wherein:
the transceiver and the processor are further configured to decode another DCI and obtain a CSI-RS reporting trigger from the decoded other DCI, the CSI reporting trigger identifying a resource set that is configured with a particular trigger offset for the aperiodic CSI-RS reporting,
the transceiver and the processor are further configured to compare the particular trigger offset to the minimum aperiodic CSI-RS offset, and
the transceiver and the processor are further configured to not report CSI associated with the identified resource set in response to the CSI-RS reporting trigger on a condition that the particular trigger offset is less than the minimum aperiodic CSI-RS offset.

11. The WTRU of claim 10, wherein the WTRU is configured with a CSI-RS report trigger state list that includes one or more entries, each of the one or more entries comprising one or more resource sets and each of the one or more resource sets includes identification of a set of time-frequency resources and a trigger offset for the resource set.

12. The WTRU of claim 10, wherein the transceiver and the processor are further configured to report CSI associated with the identified resource set in response to the CSI-RS reporting trigger on a condition that the particular trigger offset is greater than or equal to the minimum aperiodic CSI-RS offset.

* * * * *